US008724845B2

(12) United States Patent
Kobayashi

(10) Patent No.: US 8,724,845 B2
(45) Date of Patent: May 13, 2014

(54) CONTENT DETERMINATION PROGRAM AND CONTENT DETERMINATION DEVICE

(75) Inventor: Sachio Kobayashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 212 days.

(21) Appl. No.: 13/109,330

(22) Filed: May 17, 2011

(65) Prior Publication Data
US 2011/0293148 A1 Dec. 1, 2011

(30) Foreign Application Priority Data

May 25, 2010 (JP) ................................. 2010-119929

(51) Int. Cl.
G06K 9/00 (2006.01)

(52) U.S. Cl.
USPC .......................................... 382/100; 382/103

(58) Field of Classification Search
None
See application file for complete search history.

(56) References Cited

U.S. PATENT DOCUMENTS

| 7,275,687 | B2 | 10/2007 | Wada et al. | |
|---|---|---|---|---|
| 2005/0228868 | A1 | 10/2005 | Kawamichi et al. | |
| 2008/0243614 | A1* | 10/2008 | Tu et al. | 705/14 |
| 2008/0249835 | A1* | 10/2008 | Angell et al. | 705/10 |
| 2009/0222388 | A1* | 9/2009 | Hua et al. | 706/12 |

FOREIGN PATENT DOCUMENTS

| JP | 2004-054376 | 2/2004 |
|---|---|---|
| JP | 2004-227158 | 8/2004 |
| JP | 2005-157135 | 6/2005 |
| JP | 2005-165406 A | 6/2005 |
| JP | 2005-300965 A | 10/2005 |
| JP | 2006-113819 A | 4/2006 |
| JP | 2009-139857 | 6/2009 |

OTHER PUBLICATIONS

Ando, Hiroaki et al., "A Method of Measuring 3D Position and Camera Self-Calibration Based on Results of Human Detection", IEE, General Industries Division, 2009, GID-09-08 2009, English Abstract.
Gohara, Kunio et al., "Real-time Clothes Classifier based on person tracking image", IPSJ SIG Technical Reports, HI, Technical Report of Human Interface Research Group, vol. 2001, No. 87 Sep. 13, 2001, pp. 101-108, English Abstract.
Mae, Yasushi et al., "Object Tracking in Cluttered Background Based on Optical Flow and Edges", JRSJ vol. 17, No. 7, Oct. 1999.
Minamitake, Shunsuke et al., "A gaze information acquisition system to the public large screen", http://www.iplab.cs.tsukuba.ac.jp/paper/domestic/minamitake dicomo2008.pdf 2008, English Abstract.

(Continued)

Primary Examiner — Nirav G Patel
(74) Attorney, Agent, or Firm — Fujitsu Patent Center

(57) ABSTRACT

A non-transitory computer-readable medium storing a content determination program causes a computer to perform processes of detecting persons appearing in chronologically photographed images, detecting a position of each of the persons, calculating a moving velocity of each of the persons, setting a group including a part of the persons on the basis of the moving velocities and the positions, acquiring attribute information of the group on the basis of a person image corresponding to the each of the part of the persons included in the group, and determining, on the basis of a correspondence relationship between the attribute information of the group and attribute information of content images stored in a storage unit, one of the content images to be projected to a position which each of the part of the persons of the group recognizes.

13 Claims, 36 Drawing Sheets

(56) References Cited

OTHER PUBLICATIONS

Minamitake, Shunsuke et al., "Acquisition of Gaze Information to Large Screen by Analysis of Face Direction", http://www.iplab.cs.tsukuba.ac.jp/paper/bachelor/minamitake_thesis.pdf Chapter4 (pp. 11-14) 2007, Partial English Translation.

Shio, Akio et al., "Segmentation of People in Motion", Proc. IEEE Workshop on Visual Motion 1991, pp. 325-332.

Japanese Office Action mailed Jan. 21, 2014 for corresponding Japanese Application No. 2010-119929, with partial English-language translation.

* cited by examiner

FIG. 2　　　　92

| PRESENTED IMAGE | IMAGE INFORMATION | |
|---|---|---|
| I98456 | SIZE<br>LENGTH<br>INFORMATION AMOUNT | 1280×960<br>3 MINUTES<br>LARGE |
| I3456 | SIZE<br>LENGTH<br>INFORMATION AMOUNT | NORMAL<br>60 SECONDS<br>NORMAL |
| I3456 | SIZE<br>LENGTH<br>INFORMATION AMOUNT | NORMAL<br>60 SECONDS<br>NORMAL |
| I0628 | SIZE<br>LENGTH<br>INFORMATION AMOUNT | NORMAL<br>15 SECONDS<br>SMALL |
| I7980 | SIZE<br>LENGTH<br>INFORMATION AMOUNT | NORMAL<br>15 SECONDS<br>SMALL |
| ⋮ | ⋮ | |

FIG. 3

| IMAGE TYPE | CORRESPONDING IMAGE IN IMAGE HOLDING UNIT | IMAGE DISTRIBUTION PRIORITY | | CATEGORY |
|---|---|---|---|---|
| I1234 | A28793 | WINTER<br>OTHER TIMES | 10<br>0 | CLOTHES, COATS |
| I2345 | C34098, D48000 | LUNCHTIME<br>OTHER TIMES | 9.0<br>0.5 | RESTAURANTS,<br>RAMEN NOODLES |
| I3456 | F28739 | HOLIDAY<br>WEEKEND<br>OTHER TIMES | 8.2<br>5.4<br>1.0 | RESORTS,<br>AMUSEMENT PARKS |
| IWXYZ | G53298, M93253, X32405, ... | 0.63 | | COSMETICS |
| .... | .... | .... | | .... |

FIG. 4

| VIEWER ID | POSITION COORDINATES | VELOCITY VECTOR | ACCELERATION VECTOR | PREDICTED POSITION COORDINATES | DIRECTION OF FACE | DIRECTION OF EYES |
|---|---|---|---|---|---|---|
| 1 | [0, 0] | [0, 0] | [0, 0] | [0, 0] | [0, 0] | [0, 0] |
| 2 | [1, 0] | [1, 0] | [1, 0] | [1, 0] | [1, 0] | [1, 0] |
| 3 | [2, 0] | [2, 0] | [2, 0] | [2, 0] | [2, 0] | [2, 0] |
| 4 | [3, 0] | [3, 0] | [3, 0] | [3, 0] | [3, 0] | [3, 0] |
| .... | .... | .... | .... | .... | .... | .... |

FIG. 5

| VIEWER ID | GROUP INFORMATION | INDIVIDUAL ATTRIBUTE | SEX | AGE GROUP | CLOTHES | MOTIONAL STATE | DATE AND TIME | ... |
|---|---|---|---|---|---|---|---|---|
| 0001 | G0001 | OFFICE WORKER | MALE | 30'S | SUIT | AT REST, SEATED | 10/01/2009 09:30 | ... |
| 0102 | G0345 | ADULT FEMALE | FEMALE | ADULT | CASUAL, COLORFUL, SKIRT | WALKING SLOWLY | 10/11/2009 14:05 | ... |
| 0103 | G0345 | CHILD (MALE) | MALE | CHILD | CASUAL, SHORT-SLEEVED | WALKING SLOWLY | 10/11/2009 14:05 | ... |
| 1002 | G0800 | TEEN MALE | MALE | 10'S | CASUAL | WALKING FAST | 12/22/2009 18:32 | ... |
| 2301 | G1001 | ADULT FEMALE | FEMALE | ADULT | CASUAL | WALKING SLOWLY | 12/24/2009 19:22 | ... |
| 2302 | G1001 | ADULT MALE | MALE | ADULT | CASUAL | WALKING SLOWLY | 12/24/2009 19:22 | ... |
| 2345 | G2034 | ADULT FEMALE | FEMALE | ADULT | (UNKNOWN) | WALKING SLOWLY | 02/12/2010 13:45 | ... |
| ... | ... | ... | ... | ... | ... | ... | ... | ... |

| GROUP ID | GROUP ATTRIBUTE | DATE AND TIME |
|---|---|---|
| G0001 | OFFICE WORKER | 10/01/2009 09:30 |
| G0345 | PARENT AND CHILD | 10/11/2009 14:05 |
| G0800 | TEEN MALE | 12/22/2009 18:32 |
| G1001 | COUPLE | 12/24/2009 19:22 |
| G2034 | ADULT FEMALE | 02/12/2010 13:45 |
| ⋮ | ⋮ | ⋮ |

FIG. 7

| HISTORY ID | VIEWER ID | GROUP ID | GROUP ATTRIBUTE | INDIVIDUAL ATTRIBUTE | SEX | AGE GROUP | CLOTHES | MOTIONAL STATE | DATE AND TIME | CATEGORY | PRESENTED IMAGE | IMAGE INFORMATION | | GAZE RATE |
|---|---|---|---|---|---|---|---|---|---|---|---|---|---|---|
| 000001 | 0001 | G00001 | OFFICE WORKER | OFFICE WORKER | MALE | 30'S | SUIT | AT REST, SEATED | 10/01/2009 09:30 | NEWS | 198456 | SIZE LENGTH INFORMATION AMOUNT | 1280×960 3 MINUTE LARGE | 0.78 |
| 003927 | 0102 | G00345 | PARENT AND CHILD | ADULT FEMALE | FEMALE | ADULT | CASUAL, COLORFUL SKIRT | WALKING SLOWLY | 10/11/2009 14:05 | RESORTS | 134456 | SIZE LENGTH INFORMATION AMOUNT | NORMAL 60 SECONDS NORMAL | 0.04 |
| 025133 | 0104 | G00345 | PARENT AND CHILD | CHILD (MALE) | MALE | CHILD | CASUAL, SHORT-SLEEVED | WALKING SLOWLY | 10/11/2009 14:06 | RESORTS | 134456 | SIZE LENGTH INFORMATION AMOUNT | NORMAL 60 SECONDS NORMAL | 0.95 |
| 710312 | 1002 | G00800 | TEEN MALE | TEEN MALE | MALE | 10'S | CASUAL | WALKING FAST | 12/22/2009 18:32 | SHOES | 108328 | SIZE LENGTH INFORMATION AMOUNT | NORMAL 15 SECONDS SMALL | 0 |
| 710313 | 1002 | G00800 | TEEN MALE | TEEN MALE | MALE | 10'S | CASUAL | WALKING FAST | 12/22/2009 18:50 | MISC | 173980 | SIZE LENGTH INFORMATION AMOUNT | NORMAL 15 SECONDS SMALL | 0.62 |
| ... | ... | ... | ... | ... | ... | ... | ... | ... | ... | ... | ... | ... | ... | ... |

CONTENT DETERMINATION PROGRAM AND CONTENT DETERMINATION DEVICE

CROSS-REFERENCE TO RELATED APPLICATION

This application is based upon and claims the benefit of priority of the prior Japanese patent application No. 2010-119929, filed on May 25, 2010 the entire contents of which are incorporated herein by reference.

FIELD

The embodiments discussed herein are related to a content determination device which determines a content image for a plurality of persons.

BACKGROUND

In the past, there has been a system which identifies a moving person and displays a content image on an extension of the moving direction of the identified person. Further, there has been a system which displays an advertisement to a group of a plurality of persons by the use of an RFID (Radio Frequency Identification) device already possessed by each of the persons and storing personal information of the person and information relating to a plurality of persons.

The related art, however, provides the content image according to the preferences of each individual, and does not take into account of features generated by the combination of a plurality of moving persons, such as a parent and a child and a couple.

Other related art includes: Japanese Laid-open patent Publication Nos. 2006-113819, 2005-300965, 2005-165406; A. Shio and J. Sklansky, "Segmentation of People in Motion," *Proc. IEEE Workshop on Visual Motion*, pages 325 to 332, 1991; Mae Yasushi, Shirai Yoshiaki, Miura Jun, and Kuno Yoshinori, "Object Tracking in Cluttered Background Based on Optical Flow and Edges," *JRSJ*, Vol. 17, No. 7, pages 45 to 51; Gohara Kunio, Baba Naruatsu, and Ejima Toshiaki, "Real-time Clothes Classifier Based on Person Tracking Image," *IPSJ SIG Technical Reports, HI, Technical Report of Human Interface Research Group*, 2001 (87), pages 101 to 108, Sep. 13, 2001; Ando Hiroaki and Fujiyoshi Hironobu, "A Method of Measuring 3D Position and Camera Self-Calibration Based on Results of Human Detection," *IEE, General Industries Division*, 2009;

Minamitake Shunsuke, Takahashi Shin, and Tanaka Jiro, "A Gaze Information Acquisition System to The Public Large Screen,"

Minamitake Shunsuke, "Acquisition of Gaze Information to Large Screen by Analysis of Face Direction,"

SUMMARY

According to an aspect of the invention, a non-transitory computer-readable medium storing a content determination program causes a computer to perform processes of detecting a plurality of persons appearing in a plurality of chronologically photographed images, detecting a position of each of the plurality of persons, calculating a moving velocity of each of the plurality of persons, setting a group including a part of the plurality of persons on the basis of the moving velocities and the positions, acquiring attribute information of the group on the basis of a person image corresponding to the each of the part of the plurality of persons included in the group, and determining, on the basis of a correspondence relationship between the attribute information of the group and attribute information of content images stored in a storage unit, one of the content images to be projected to a position which each of the part of the plurality of persons of the group recognizes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates a configuration of a library of content images;

FIG. 3 illustrates a configuration example of content image management information;

FIG. 4 illustrates a configuration example of motional state information;

FIG. 5 illustrates a configuration example of attribute information;

FIG. 6 illustrates a configuration example of group attribute information;

FIG. 7 illustrates a configuration example of gaze history information;

DESCRIPTION OF EMBODIMENTS

Hereinafter, preferred embodiments will be described in detail with reference to drawings.

Content Determination Device 10 (Content Projector)

Figure 1:
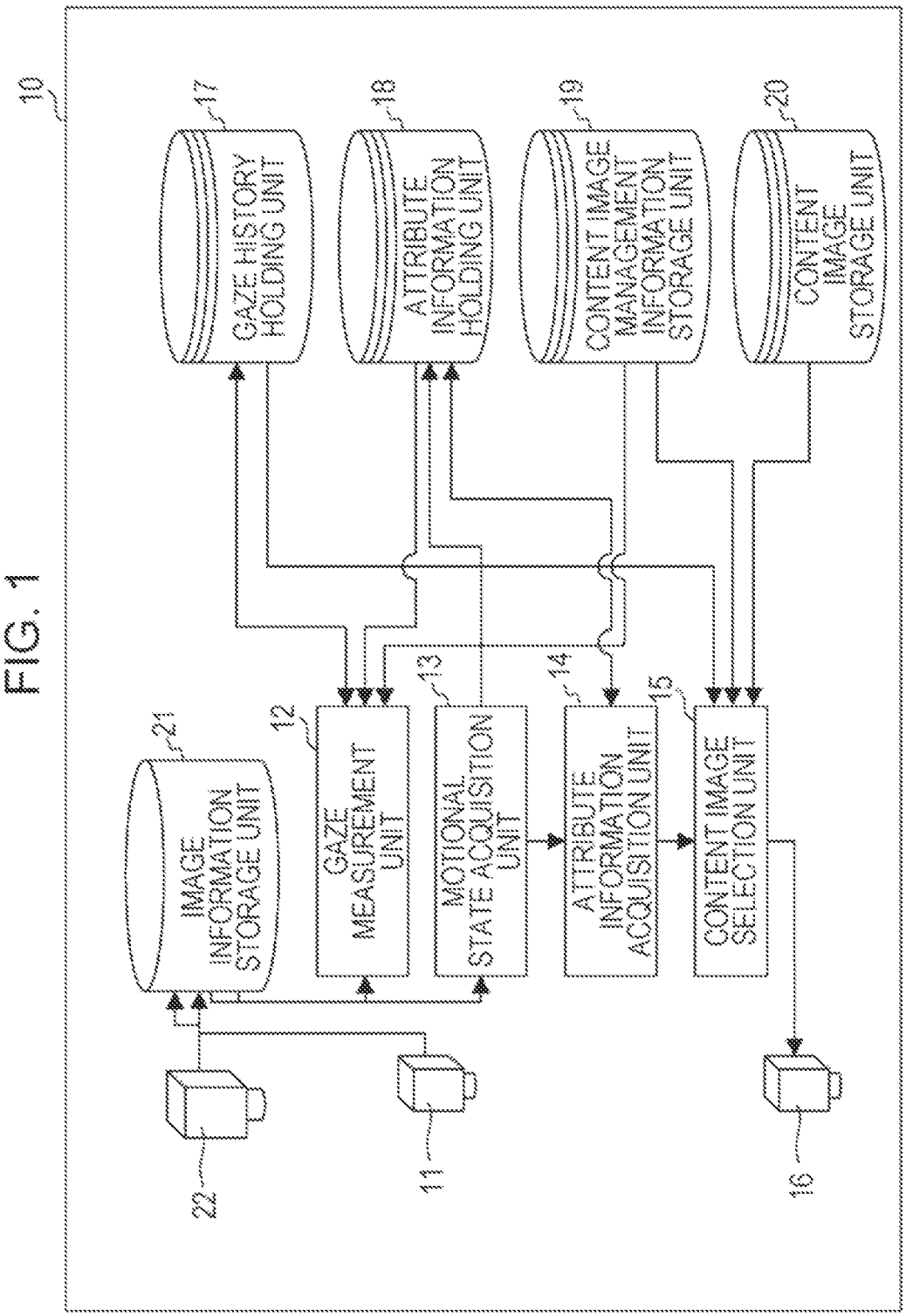
FIG. 1 is a functional block diagram of a content determination device according to an embodiment of the present invention.

FIG. 1 is a functional block diagram of a content determination device 10 (a content projector) according to the present embodiment.

The content determination device 10 according to the present embodiment displays a plurality of content images of, for example, advertisements previously assigned with presentation priorities. The content determination device 10 determines the type, the reproduction time length, the size, and the information amount of the content image in accordance with the attribute of a group formed by an individual or the combination of individuals. As a result, the content determination device 10 is capable of presenting a content image suitable for a plurality of persons.

In the following, the term "person" refers to a human included in the image photographed by a photographing unit 11. It is assumed that persons are at rest or walking at respective velocities within the photographing range.

In the following, "image" is a general term for still images and moving images, and refers to the image acquired by the photographing unit 11. The term "content image" hereinafter refers to a still or moving image of, for example, an advertisement displayed to a person, which is the image output by a content image display unit 16. In the present embodiment, the content image is projected on the floor in the moving direction of a group.

The information included in data described below may be represented by character strings or numerical values. If numerical values are used, an administrator previously defines a table associating categorized states with the numerical values.

The photographing unit 11 photographs an image. The photographing unit 11 is installed at a location allowing the photographing unit 11 to photograph a person from above the head toward the feet. For example, the photographing unit 11 is installed on the ceiling, and photographs the image in the direction of the floor.

An image information storage unit 21 stores the image photographed by the photographing unit 11.

In the content determination device 10, a second photographing unit 22 may be installed at a position allowing the second photographing unit 22 to photograph the face of a person.

A content image storage unit 20 is a library of content images. FIG. 2 illustrates a configuration of a library 92 of content images. The library 92 includes information representing features, such as the display size and the amount of letters, of each of the content images. The content image may be occasionally referred to as the projection image.

A content image management information storage unit 19 stores content image management information 95. FIG. 3 illustrates a configuration example of the content image management information 95. The content image management information 95 includes information of the image type for identifying the type of the content image, information for identifying the content image in the library 92, the image distribution priority specifying the distribution priority of the content image, and the category of the content image. The image distribution priority is set to be associated with information of the date and time for presenting the content image and the attribute information of the group to which the content image is intended to be presented. For example, it is now assumed that a content image corresponding to an image type "I1234" is the image of a commercial product desired to be sold in winter. The image distribution priority is previously set to a large value for winter and a small value for the other seasons. In the example of FIG. 3, the image distribution priority of the content image corresponding to the image type "I1234" is set to a value of "10" for winter and a value of "0" for the other seasons. The administrator previously sets the image distribution priority.

A motional state acquisition unit 13 (calculation means) detects the position of the person appearing in the image, and calculates the moving velocity of the detected person. Further, the motional state acquisition unit 13 stores the acquired motional state of the person in an attribute information holding unit 18 as motional state information 93.

FIG. 4 illustrates a configuration example of the motional state information 93. The motional state information 93 includes the viewer ID (Identifier), the position coordinates, the velocity vector, the acceleration vector, the predicted position coordinates, the direction of the face, and the direction of the eyes. The viewer ID is information for identifying the person appearing in the latest image. The viewer ID of the person is shared by the motional state information 93 and attribute information 99, gaze history information 97, and so forth described later. The position coordinates are information for identifying the position of the viewer in the image. The velocity vector is information including the moving direction of the viewer and the velocity at which the viewer moves in the moving direction. The acceleration vector is information including the acceleration direction of the viewer and the value of the acceleration in the acceleration direction. The predicted position coordinates are information of the position at which the viewer is predicted to be located in a future image. The direction of the face and the direction of the eyes are information representing the direction of the face of the viewer and information representing the direction of the eyes of the viewer, respectively.

An attribute information acquisition unit 14 (association means and acquisition means) identifies the attribute information 99, which categorizes the person detected by the motional state acquisition unit 13 on the basis of the appearance of the person appearing in the image. The attribute information 99 is identified on the basis of, for example, the sex, the clothes, and the age (child or adult) of the person determined by the appearance. The attribute information 99 stores the attribute of each person.

FIG. 5 illustrates a configuration example of the attribute information 99. The viewer ID of the attribute information 99 is identification information for identifying the person appearing on the screen. The group information of the attribute information 99 is identification information for identifying a group including the person corresponding to the viewer ID. The individual attribute of the attribute information 99 is information categorized by the appearance of the person. The sex of the attribute information 99 is information representing the sex categorized by the appearance of the person or acquired from the RFID device. The age group of the attribute information 99 is information representing the age group categorized by the appearance of the person or acquired from the RFID device. The clothes of the attribute information 99 is information representing the clothes categorized by the appearance of the person. The motional state of the attribute information 99 is information describing the motional state of the person. The date and time of the attribute information 99 is information representing the date and time of updating or registration of the corresponding attribute information.

The attribute information holding unit 18 stores the attribute information 99 acquired by the attribute information acquisition unit 14.

The attribute information acquisition unit 14 identifies the group on the basis of the motional state of the person detected by the motional state acquisition unit 13. The attribute information acquisition unit 14 identifies the attribute of the group on the basis of the combination of the attribute information items of the persons forming the identified group. The attribute information acquisition unit 14 stores group attribute information 98 in the attribute information holding unit 18 as the identified attribute of the group.

FIG. 6 illustrates a configuration example of the group attribute information 98. The group attribute information 98 includes the group ID for identifying the group, the group attribute representing the attribute of the group, and the date and time of identification of the group. The group attribute information 98 stores the attribute of each group.

A gaze information measurement unit 12 calculates gaze information. The gaze information refers to information indicating whether or not a person has gazed at a content image displayed to the person. The gaze information measurement unit 12 stores the history of the calculated gaze information in a gaze history holding unit 17 as the gaze history information 97.

FIG. 7 illustrates a configuration example of the gaze history information 97. The gaze history information 97 includes the history ID, the viewer ID, the group ID, the group attribute, the individual attribute, the sex, the age group, the clothes, the motional state, the date and time, the category, the presented image, the image information, the gaze rate, and so forth. The history ID is information for identifying the record. The viewer ID is information for identifying the person in the image. In the present embodiment, if a person moves out of the processing range of the content determination device 10 and then again moves into the processing range of the content determination device 10, the content determination device 10 treats the person as a new person. However, if information capable of identifying the person is available from the RFID device or the like, for example, the content determination device 10 can treat the person as the same person. The group ID is information for identifying the group.

The group attribute, the individual attribute, the sex, the age group, the clothes, the motional state, and the date and time of the gaze history information 97 are the same information as the corresponding information of the attribute information 99 and the group attribute information 98. The category is the content image category of the content image, such as news, resort information, shoes, and music. The administrator previously registers the categories of the content images. The presented image is information for identifying the content image. The image information represents features of the presented content image, e.g., the size, the reproduction time, and the information amount of the content image. The content determination device 10 can include a plurality of content determination devices 10 which introduce the same commercial product. As a result, the content determination device 10 can switch the content images to be displayed, depending on the moving velocity or the attribute of the group. For example, when introducing the same commercial product to a group moving at a high moving velocity, the content determination device 10 presents a content image including more pictures than letters. Further, when introducing the same commercial product to a group including a child, the content determination device 10 presents a content image including more pictures than letters. The gaze rate is the rate of gaze at a content image by a person, which is represented by a numerical value expressed as a real number ranging from 0 to 1.

The gaze history holding unit 17 stores the gaze history information 97 including the gaze information, the information of the presented content images, the date and time information, the attribute information of the persons and the groups, and the motional states.

A content image selection unit 15 (determination means) determines the content image to be displayed to a group. The content image selection unit 15 determines the category of the content image to be output to a person or a group on the basis of the histories of the gaze information in the gaze history holding unit 17 and the distribution priorities in the content image management information storage unit 19.

On the basis of the motional state of the group, the content image selection unit 15 identifies, among the content images belonging to the determined category, a content image satisfying the reproduction time length, the presented image size, and the information amount of the content image to be presented. The content image selection unit 15 displays, through the content image display unit 16 (projection unit), the identified content image to the group to which the content image is intended to be displayed.

Overall Operation of Content Determination Device 10

Figure 8:
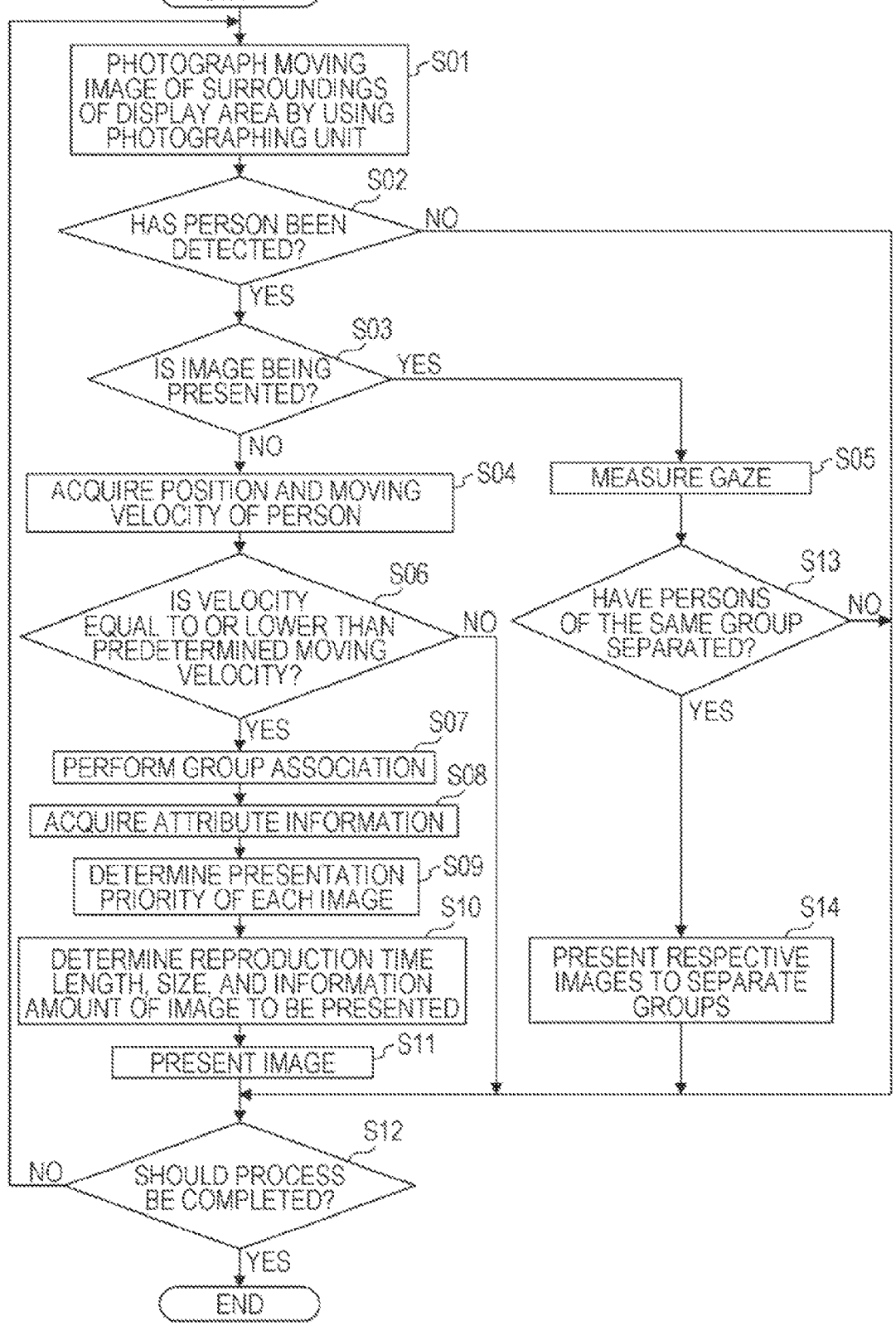
FIG. 8 is an overall operational flowchart of the content determination device.

Subsequently, an overall operation of the content determination device 10 will be described. FIG. 8 is an overall operational flowchart of the content determination device 10.

The photographing unit 11 photographs the image including an area in which a content image can be displayed (Step S01). The photographing unit 11 photographs a photographic subject at predetermined time intervals, stores the image in the image information storage unit 21, and transmits the image to the motional state acquisition unit 13.

The motional state acquisition unit 13 determines whether or not a person has been detected in the image photographed at Step S01 (Step S02).

If a person has not been detected at Step S02 within the projection area in the photographed image (NO at Step S02), the motional state acquisition unit 13 proceeds to a determination process of Step S12 for determining whether or not to complete the process. Meanwhile, if a person has been detected at Step S02 (YES at Step S02), the motional state acquisition unit 13 determines whether or not a content image is already being presented to the person detected at Step S02 (Step S03). If a content image is already being presented (YES at Step S03), the gaze information measurement unit 12 measures the state of gaze at the presented content image by the person (Step S05). The measurement of the gaze information will be described later.

Then, the attribute information acquisition unit 14 determines whether or not persons forming a group have separated (Step S13). The attribute information acquisition unit 14 associates a plurality of persons with a group in accordance with the respective velocity vectors of the plurality of persons, the distances between the plurality of persons, and so forth. If the group has separated into a plurality of groups (YES at Step S13), the motional state acquisition unit 13 presents content images to the respective separate groups (Step S14). Meanwhile, if the group has not separated into groups (NO at Step S13), the motional state acquisition unit 13 proceeds to the process of Step S12.

Meanwhile, if a content image is not being presented (NO at Step S03), the motional state acquisition unit 13 determines whether or not the moving velocity of the person calculated at Step S04 is equal to or lower than a predetermined moving velocity (Step S06). If the moving velocity of the person is neither equal to nor lower than the predetermined moving velocity (NO at Step S06), the procedure proceeds to Step S12 without presenting a content image. This is because it is assumed that the target person is in a hurry, and it is highly possible that the person will not gaze at a content image presented to him/her.

Meanwhile, if the moving velocity of the person is equal to or lower than the predetermined moving velocity (YES at Step S06), the attribute information acquisition unit 14 performs group association on the basis of the position, the moving direction, and the moving velocity of the person in the image (Step S07). The group association process will be described later.

The attribute information acquisition unit 14 acquires the attribute information of each group (Step S08). The attribute information acquisition unit 14 performs image processing on person images included in the image, to thereby identify the attributes of individuals. Thereafter, on the basis of the identified attributes of the persons, the attribute information acquisition unit 14 determines the attribute of the group.

The content image selection unit 15 determines the priorities in presenting the content images on the basis of the gaze rates of the gaze history information 97 and the distribution priorities of the content image management information 95 previously set by the administrator (Step S09). Details of a method of calculating the priorities will be described later. In accordance with the priorities, the content image selection unit 15 determines the content image to be presented. The content image selection unit 15 determines the content image to be projected on the basis of the correspondence relationship between the attribute information of the group and the attribute information of the content images stored in a storage unit.

In accordance with the moving velocity of the person calculated at Step S04 and the attribute of the group identified at Step S08, the content image selection unit 15 determines the reproduction time length, the presented image size, and the information amount of the content image to be presented (Step S10). The content determination device 10 is capable of storing, for each content item, a plurality of content images different in reproduction time length, presented image size, and information amount. If the content determination device 10 stores a plurality of content images for the same content item, the content determination device 10 selects the most suitable content image. A method of determining the content image will be described later.

The content image display unit 16 presents the content image determined at Step S10 (Step S11).

The content determination device 10 determines whether or not to complete the process of displaying the content image (Step S12). If it is determined to complete the process of displaying the content image (YES at Step S12), the content determination device 10 completes the process of displaying the content image. Meanwhile, if it is determined not to complete the process of displaying the content image (NO at Step S12), the content determination device 10 again performs the process from Step S01.

Method of Calculating Moving Velocity

Subsequently, description will be made of the process of detecting a person in the image photographed by the photographing unit 11 and the process of calculating the position, the moving direction, and the moving velocity of the detected person, which are performed at Steps S02 to S04 in FIG. 8. The calculation of the position and the moving velocity of a person is performed by, for example, a background differencing method or a method using an optical flow indicating the moving direction of an object. In the present embodiment, an embodiment example using the background differencing method will be described.

The background differencing method refers to a process of previously photographing a background image not including a detection target, and detecting the detection target from the difference between the background image and an input image photographed separately from the background image under the same condition as the condition for the background image.

Figure 9:
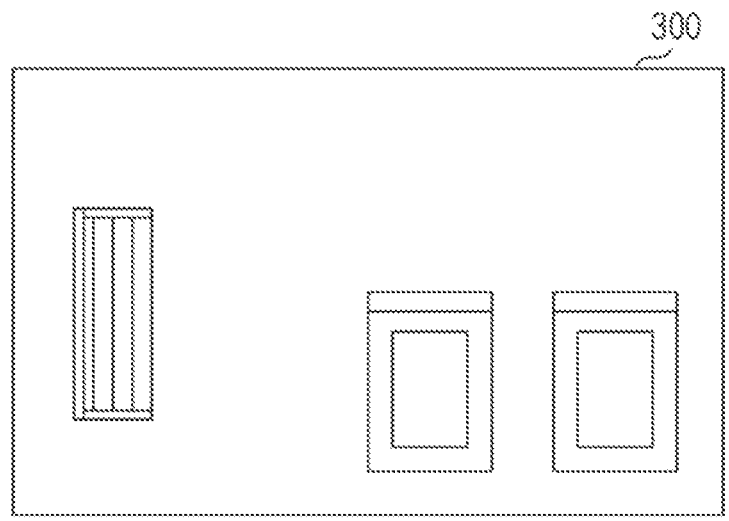
FIG. 9 illustrates a background image photographed by a photographing unit.
Figure 10:
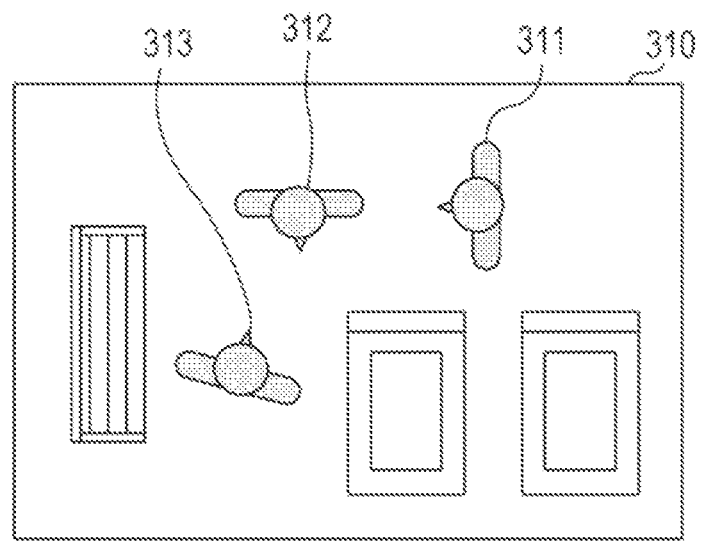
FIG. 10 illustrates an input image photographed by the photographing unit.
Figure 11:
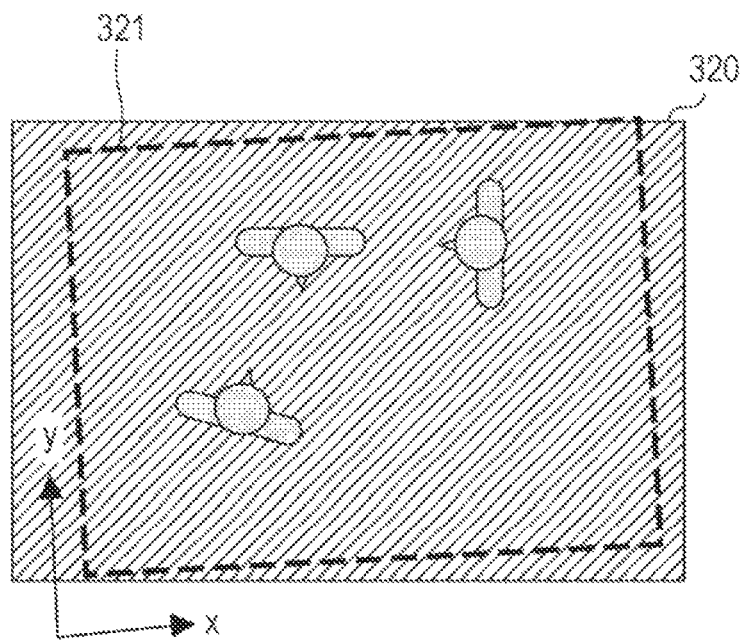
FIG. 11 illustrates a differential image obtained by the difference between the image of FIG. 9 and the image of FIG. 10.

FIGS. 9 to 11 are diagrams for explaining a process of extracting persons by using the background differencing method. FIG. 9 illustrates a background image 300 photographed by the photographing unit 11. As the background image, the photographing unit 11 previously photographs a still image, for example. It is assumed that the coordinate system of the background image 300 is represented as fa(x, y). FIG. 10 illustrates an input image 310 photographed by the photographing unit 11. As the input image, the photographing unit 11 photographs still images at predetermined time intervals, or photographs a moving image, for example. The coordinate system of the input image 310 is represented as fb(x, y). Reference numerals 311, 312, and 313 represent persons appearing in the image. FIG. 11 illustrates a differential image 320 obtained from the difference between the image of FIG. 10 and the image of FIG. 9. The coordinate system of the differential image 320 is represented as F(x, y). On the basis of the difference in features between the background image 300 and the input image 310, the motional state acquisition unit 13 identifies the differential image 320 in accordance with, for example, the following formula (1).

$$F(x,y) = |f_a(x,y) - f_b(x,y)| \quad (1)$$

The motional state acquisition unit 13 performs a denoising process on the differential image 320 by, for example, determining, as noise, a small area difficult to assume as a human. Further, for example, the motional state acquisition unit 13 previously stores, in a memory 52, the area information of the persons detected in the past, and compares the area information of the past persons with the denoised differential image 320. Thereby, the motional state acquisition unit 13 is capable of determining whether an area present in the differential image 320 is a person or a non-person object.

A content image presented to a person is also detected in a differential image. Thus, the differential image also includes the area in which the content image is present. Therefore, the motional state acquisition unit 13 performs, for example, the following process to remove the presentation area of the content image from the differential image. The motional state acquisition unit 13 stores the coordinates of the centroid of the content image presentation area included in the content image display area in the immediately preceding content image display process. The motional state acquisition unit 13 extracts the areas present in the differential image, and identifies the coordinates of the centroid of each of the extracted areas. The motional state acquisition unit 13 identifies the coordinates of the centroid of an area matching the stored coordinates of the centroid of the immediately preceding content image presentation area. The motional state acquisition unit 13 determines that the identified coordinates of the centroid represent the content image presentation area.

The motional state acquisition unit 13 assumes that a person is present in a separate area in the denoised differential image, and determines the coordinates of the centroid of the separate area as the position of the person in the differential image. Further, the motional state acquisition unit 13 performs the conversion of the coordinate system from the coordinate system of the differential image into the coordinate system of the content image projected by the content image display unit 16.

If there is a difference between the coordinate system of the differential image and the coordinate system of the content image projected by the content image display unit 16, the motional state acquisition unit 13 performs the conversion of the coordinate system in accordance with, for example, the following procedure.

The motional state acquisition unit 13 previously measures and stores the amount of the difference between the coordinate system of the differential image and the coordinate system of the content image. On the basis of the previously measured amount of the difference in coordinates, the motional state acquisition unit 13 converts the coordinate values of the differential image 320 into the coordinate values of the content image, to thereby perform the conversion of the coordinate system from the coordinate system of the differential image 320 into the coordinate system of the content image projected by the content image display unit 16. For example, a broken line 321 in FIG. 11 represents the coordinate system of the content image.

The motional state acquisition unit 13 acquires the position of a person from the differential image subjected to the coordinate conversion. Further, the motional state acquisition unit 13 calculates the velocity vector of the person on the basis of the difference in the position of the person between the differential images acquired for different frames. The velocity vector is information including the moving velocity and the moving direction.

If there is no means for identifying a person, the motional state acquisition unit 13 associates a person extracted from the latest image with a person extracted from the past images. If the photographing unit 11 photographs a moving image, the motional state acquisition unit 13 associates persons with each other between the frames of the moving image. The motional state acquisition unit 13 compares the currently acquired differential image with a differential image acquired in the past, to thereby calculate the moving velocity, the acceleration, and the moving direction of a person. For example, the motional state acquisition unit 13 is capable of determining that, if the position coordinates of a person in a past image is the closest to the position coordinates of a person in the present image, the persons are the same person. Further, the motional state acquisition unit 13 is capable of determining that, if the position coordinates of a person present in the present image is the closest to the predicted position coordinates at which a person in a past image is predicted to be located in the present image, the persons are the same person.

Further, the motional state acquisition unit 13 acquires the direction of the face, the direction of the eyes, and so forth of each person, and stores the acquired information in the motional state information 93.

The direction of the face of a person is acquired from a moving image, and the direction of the eyes is estimated. Thereby, the gaze information is acquired. In this case, the second photographing unit 22 is installed at a position allowing the second photographing unit 22 to photograph the face of a person.

Figure 12:
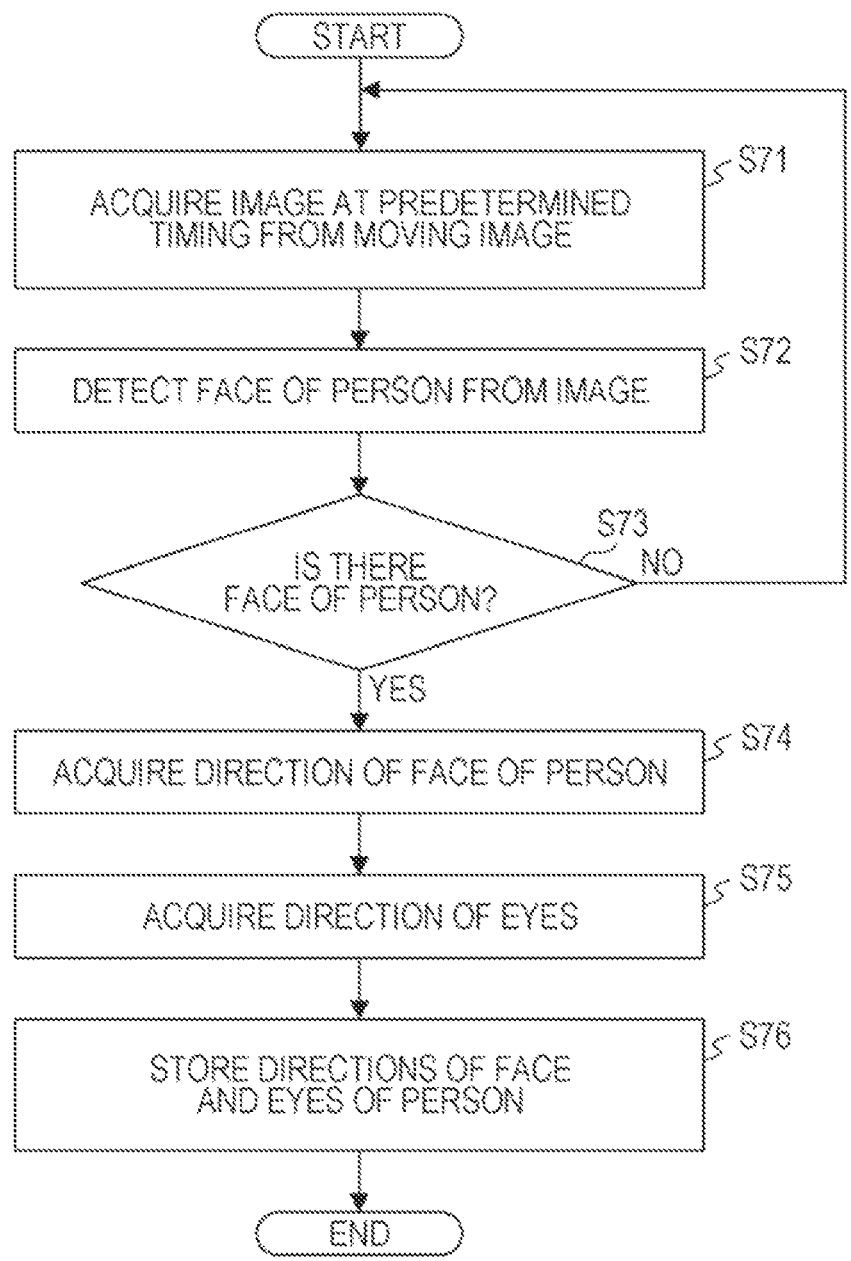
FIG. 12 is a flowchart of a process of identifying the respective directions of the face and the eyes of a person.

FIG. 12 is a flowchart of a process of identifying the respective directions of the face and the eyes of a person.

The motional state acquisition unit 13 acquires an image (Step S71). As for the image acquisition timing, images may be continuously acquired during the presentation of a content image, or may be discretely acquired at arbitrary times during the display time of the content image.

The motional state acquisition unit 13 detects a face portion of a person from the image acquired at Step S71 (Step S72).

The motional state acquisition unit 13 determines whether or not the face of a person has been detected at Step S72 (Step S73). For example, the motional state acquisition unit 13 performs image processing on the image acquired at Step S71 and extracts a grayscale view, edge information, and color information of the image, to thereby determine whether or not the face has been detected in the image.

If the face has not been detected in the image (NO at Step S73), the motional state acquisition unit 13 again performs the process of Step S71 for acquiring an image. Meanwhile, if the face has been detected in the image (YES at Step S73), the motional state acquisition unit 13 extracts the direction of the face of the person in the image (Step S74).

The motional state acquisition unit 13 identifies the face of the person in the image. The face of a person includes a convex nose located at the center thereof. Therefore, on the basis of the information of the position of the nose in the face portion and the centroid of a flesh-colored area in the image, the motional state acquisition unit 13 estimates the direction of the face of the person in the image. The motional state acquisition unit 13 identifies the direction of the eyes of the person in the image (Step S75). The motional state acquisition unit 13 stores the identified directions of the face and the eyes of the person in the motional state information 93 (Step S76).

Group Association Process: Subsequently, the group association process of Step S07 will be described. In the present embodiment, a group refers to a collection of a plurality of persons having some relationship therebetween. The attribute information acquisition unit 14 determines the group of the persons obtained from the differential image, and identifies the group information. The group information includes identification information of the plurality of persons included in the group. The attribute information acquisition unit 14 determines the presence or absence of a relationship between the plurality of persons on the basis of whether or not a preset standard (rule), which determines whether or not each of the persons belongs to the group, is satisfied.

Figure 13:
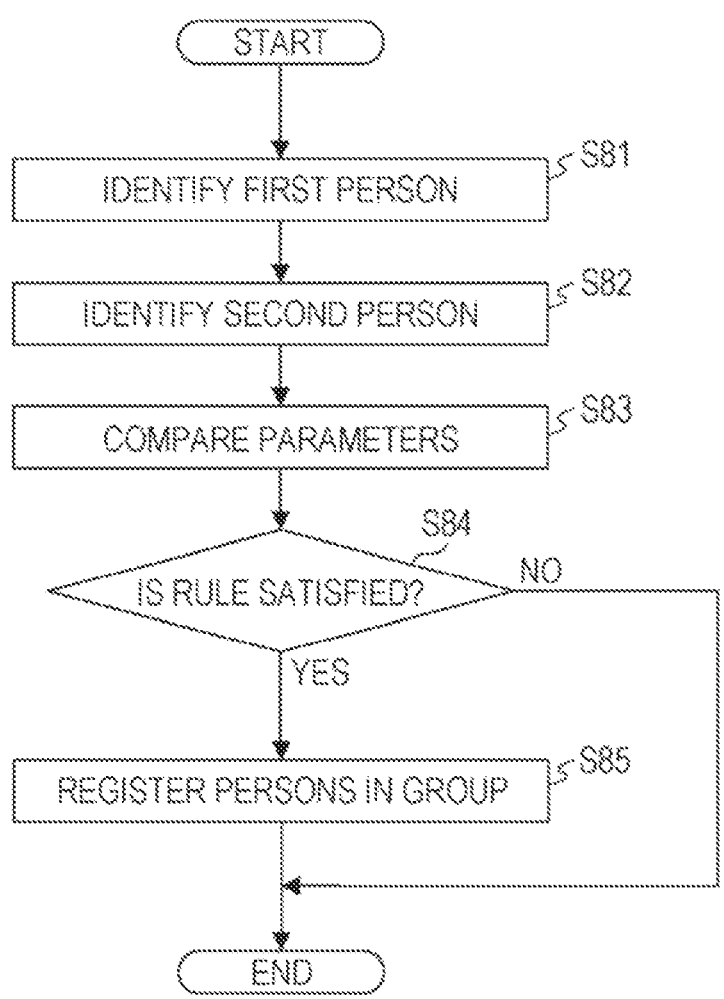
FIG. 13 is a flowchart of a process of group association.

FIG. 13 is a flowchart of a process of group association. The attribute information acquisition unit 14 performs the group determination process on the basis of the motional state of a person within a predetermined time range. The predetermined time range corresponds to a time period from an arbitrary time t1 to an arbitrary time t3. The attribute information acquisition unit 14 performs the group determination process every time a content image is completed or when a person newly enters the image acquisition area. In the present embodiment, the rule is defined on the basis of the relationship between the positions, the velocities, the directions, and the face directions of a plurality of persons.

The attribute information acquisition unit 14 identifies an arbitrary specified person (first person) in the image (Step S81).

In the present embodiment, the attribute information acquisition unit 14 performs, on each of the persons in the image, the process of determining whether or not the person satisfies the condition of the group. Therefore, the attribute information acquisition unit 14 selects each of the persons in the image as the first person. It is possible to select, as appropriate, not to perform an overlapping determination process by the attribute information acquisition unit 14.

The attribute information acquisition unit 14 identifies an arbitrary specified person (second person) in the image (Step S82). The attribute information acquisition unit 14 performs, on each of the persons in the image, the process of determining whether or not the person satisfies the condition of the group with respect to the first person. Therefore, a plurality of persons may correspond to the second person at Step S82.

When detecting the second person to be compared with the first person, the attribute information acquisition unit 14 may retrieve a person located in the vicinity of the first person, not retrieving from the entire image a candidate for the group related to the first person. When retrieving a person located in the vicinity of the first person, the attribute information acquisition unit 14 detects a person located within a predetermined range from the first person. Whether or not the second person is present within the predetermined range from the first person is determined on the basis of whether or not the distance between the two persons, which is calculated on the basis of the position information of the persons stored in the motional state information 93, is within a predetermined distance.

Then, the attribute information acquisition unit 14 compares the parameters of the first person with the parameters of the second person (Step S83). The parameters are data stored in the motional state information 93. The attribute information acquisition unit 14 reads, from the motional state information 93, parameters such as the positions, the velocities, the accelerations, the directions, the directions of the face, and the directions of the eyes of the respective records corresponding to the first and second persons, and compares the parameters between the persons.

The attribute information acquisition unit 14 determines whether or not the relationship between the plurality of identified persons satisfies the preset rule (Step S84). If the relationship does not satisfy the rule (NO at Step S84), the attribute information acquisition unit 14 performs the process on the next person. The attribute information acquisition unit 14 performs the process from Step S81 until the completion of the determination process on all of the persons in the image.

Meanwhile, if the relationship satisfies the rule (YES at Step S84), the attribute information acquisition unit 14 determines that the first person and the second person form a group, and registers the first person and the second person in a group in association with each other (Step S85). Specifically, the attribute information acquisition unit 14 assigns the identified group a group ID for identifying the group, and registers the group assigned with the group ID in the group attribute information 98 together with the date and time of identification of the group.

It is also possible to previously define a rule specifying the relationship between three or more persons. Further, in the present embodiment, a person eventually not associated with any of the other persons is determined as a group formed solely by one person.

The rule will be described below. Whether or not a person is moving is first determined. If a person is moving, a group determination process for a moving person is performed. Meanwhile, if a person is at rest, a group determination process for a person at rest is performed.

Description will be first made of the group determination process for a moving person.

Figure 14:
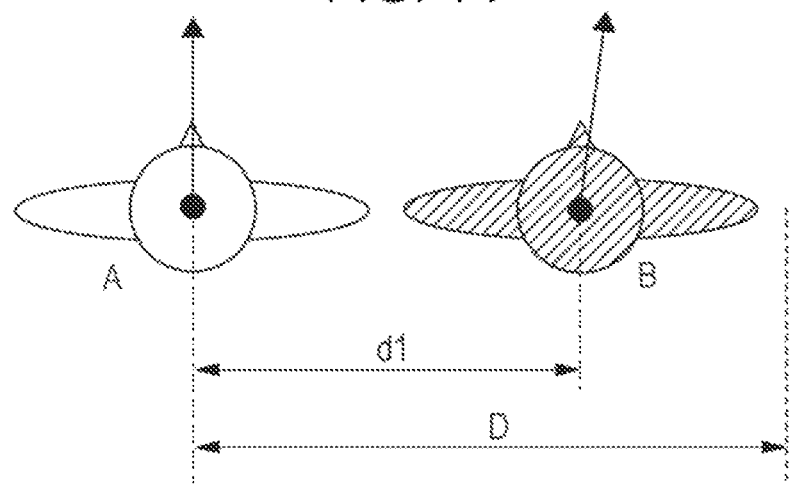
FIG. 14 illustrates an example of group association at a time.
Figure 16:
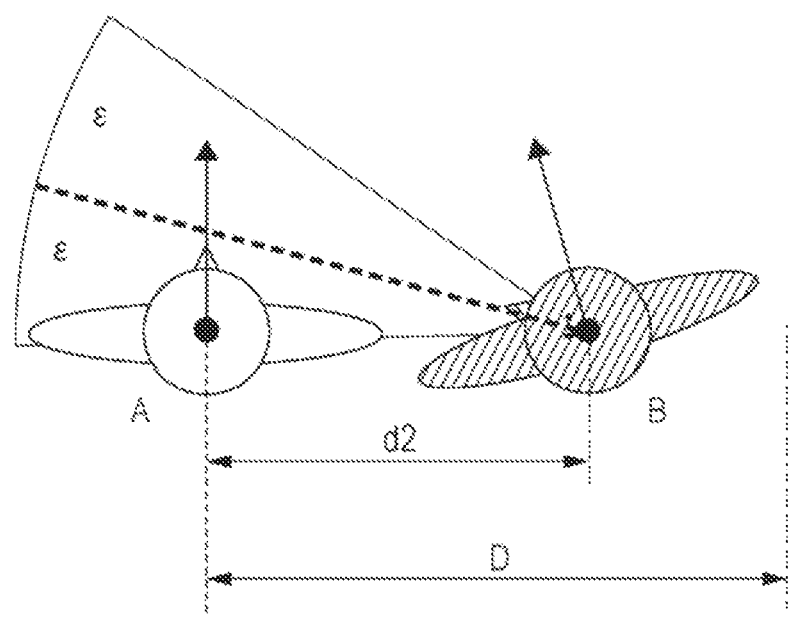
FIG. 16 illustrates an example of group association at another time.
Figure 18:
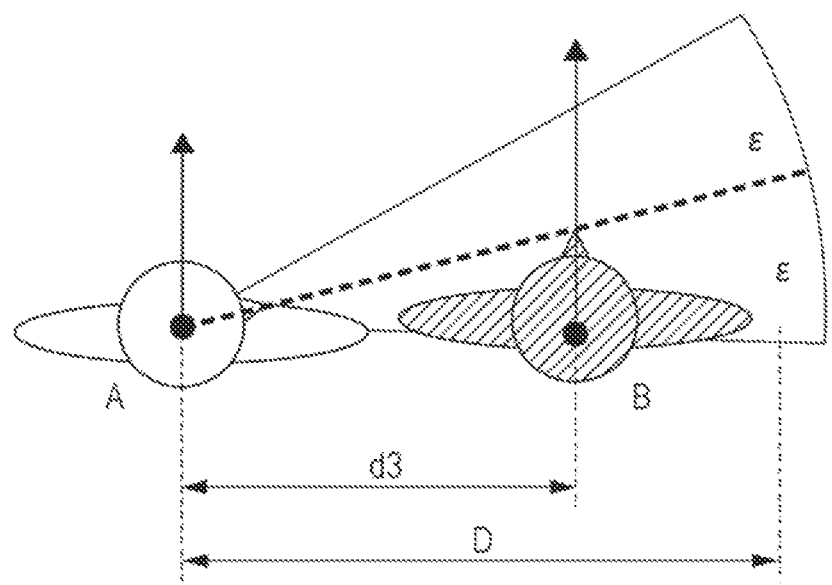
FIG. 18 illustrates an example of group association at still another time.

FIGS. 14, 16, and 18 are diagrams for explaining states of moving viewers. It is assumed that FIG. 14 illustrates a state at a time t1, FIG. 16 illustrates a state at a time t2, and FIG. 18 illustrates a state at a time t3. The time is assumed to lapse from the time t1 to the time t2 and from the time t2 to the time t3. Arrows attached to viewers A and B indicate the respective moving directions of the viewers A and B.

The attribute information acquisition unit 14 identifies the first person (assumed to be the viewer A). The attribute information acquisition unit 14 identifies the specified second person (assumed to be the viewer B) among the persons located within a distance represented by an arbitrary constant R from the viewer A. When the viewers A and B satisfy the following relationships, the attribute information acquisition unit 14 associates the viewers A and B with each other as a group.

The present embodiment includes, for example, the following three relationships.

Figure 15:
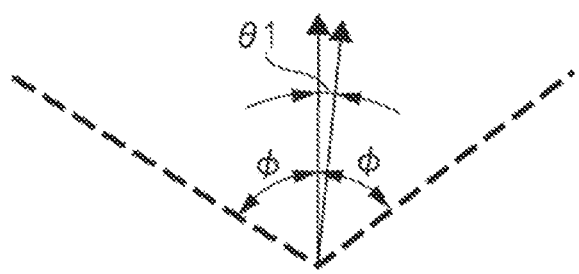
FIG. 15 is a diagram illustrating the angle formed by velocity vectors in FIG. 14.
Figure 17:
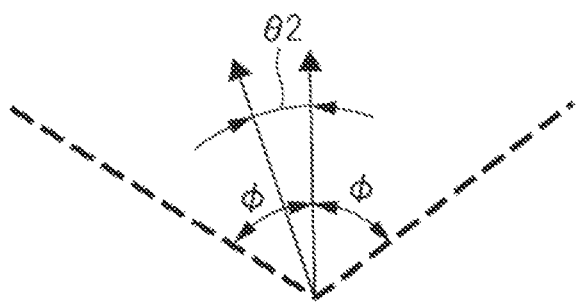
FIG. 17 is a diagram illustrating the angle formed by velocity vectors in FIG. 16.
Figure 19:
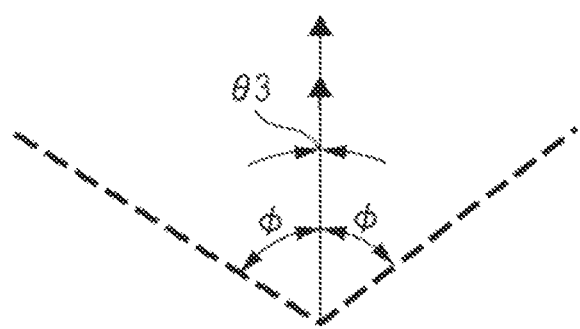
FIG. 19 is a diagram illustrating the angle formed by velocity vectors in FIG. 18.

The first condition is that the viewers A and B are moving in substantially the same direction. In FIGS. 14, 16, and 18, the viewers A and B are moving in substantially the same direction. If an angle θ formed by the velocity vector of the viewer A and the velocity vector of the viewer B is equal to or less than a predetermined angle φ during the period from the time t1 to the time t3, the attribute information acquisition unit 14 determines that the first condition is satisfied. FIGS. 15, 17, and 19 illustrate angles θ1, θ2, and θ3, respectively, which are formed by the velocity vector of the viewer A and the velocity vector of the viewer B in FIGS. 14, 16, and 18, respectively.

The second condition is that the viewers A and B are located close to each other. If a distance d between the viewers A and B is equal to or less than a predetermined distance D during the period from the time t1 to the time t3, the attribute information acquisition unit 14 determines that the second condition is satisfied. In FIGS. 14, 16, and 18, distances d1, d2, and d3 between the viewers A and B are less than the predetermined distance D.

The third condition is that the viewer A is looking at the viewer B, or that the viewer B is looking at the viewer A. If an angle τ formed by the direction of the face of the viewer A and a vector VAB connecting the position of the viewer A to the position of the viewer B is equal to or less than a predetermined angle ε and an angle λ formed by the velocity vector of the viewer A and the vector VAB is equal to or more than a predetermined angle Λ during the period from the time t1 to the time t3, the attribute information acquisition unit 14 determines that the third condition is satisfied. If the viewer B is looking at the viewer A, the viewers A and B replace each other in the above-described third condition.

FIGS. 14, 16, and 18 are diagrams illustrating the states of the viewers A and B at the times t1, t2, and t3, respectively. The viewers A and B satisfy the first and second conditions at each of the times t1, t2, and t3. Further, the viewers A and B satisfy the third condition at the times t2 and t3. In this case, the viewers A and B are associated with each other as a group.

It is possible for a designer to define a condition that the viewers A and B are determined as a group only when all of the first, second, and third conditions are satisfied during the period from the time t1 to the time t3. In the present embodiment, if the first and second conditions are constantly satisfied and a state satisfying the third condition is detected during the period from the time t1 to the time t3, the viewers A and B are associated with each other as a group.

Figure 20:
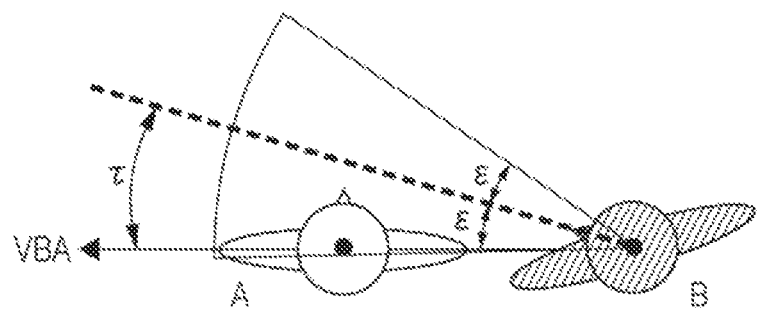
FIG. 20 is an explanatory diagram of the direction of the eyes of a viewer.
Figure 21:
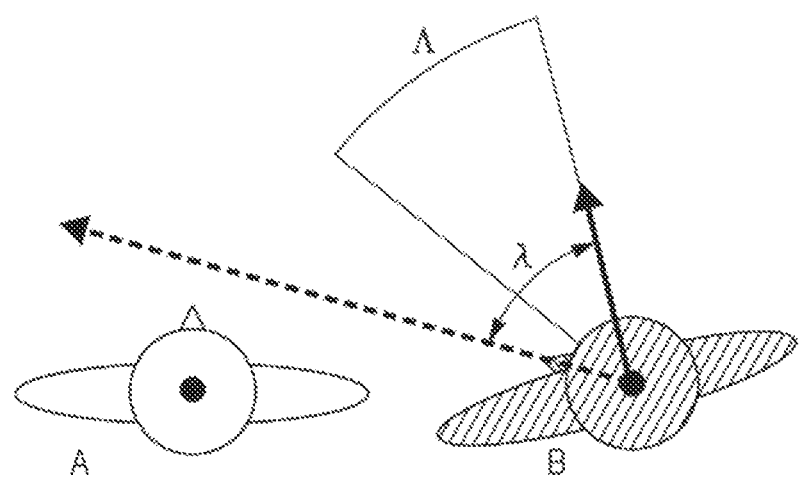
FIG. 21 is an explanatory diagram of the velocity vector and the direction of the face.

FIG. 20 illustrates that the face direction vector of the viewer B and a vector VBA connecting the position of the viewer B to the position of the viewer A form the angle τ. Further, FIG. 20 illustrates the range of the angle ε from the face direction vector of the viewer B. In FIG. 20, the angle τ formed by the face direction vector of the viewer B and the vector VBA connecting the position of the viewer B to the position of the viewer A is within the range of the angle ε from the face direction vector of the viewer B. FIG. 21 illustrates that the face direction vector of the viewer B and the velocity vector of the viewer B form the angle λ, and that the angle λ is more than the predetermined angle Λ. On the basis of FIGS. 20 and 21, the viewers A and B satisfy the third condition.

Figure 22:
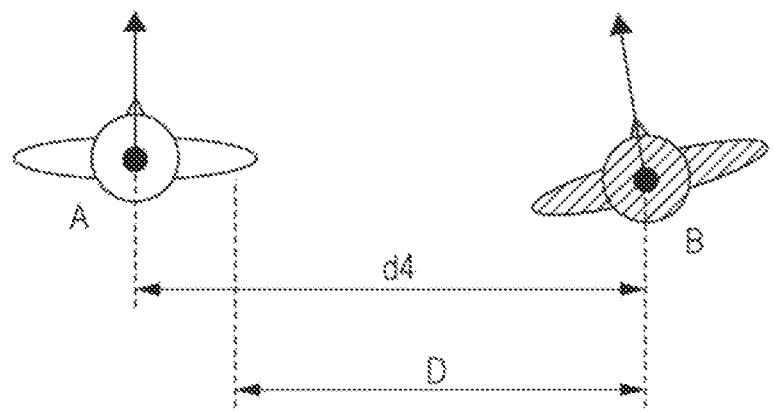
FIG. 22 illustrates an example illustrating the respective positions of viewers in a relationship not satisfying a rule.
Figure 23:
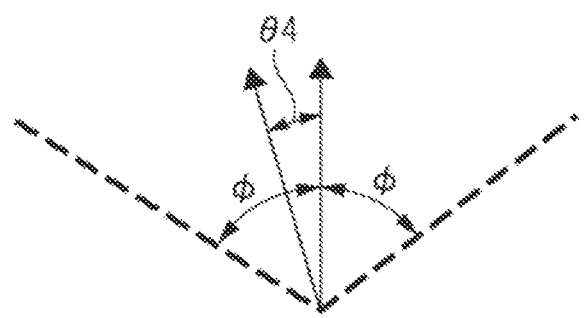
FIG. 23 is a diagram illustrating the respective velocity vectors of the viewers in the example of FIG. 22.

FIG. 22 illustrates an example illustrating the respective positions of the viewers A and B in a relationship not satisfying the rule. FIG. 23 is a diagram illustrating the respective velocity vectors of the viewers A and B in the example of FIG. 22. In FIG. 22, a distance d4 between the viewers A and B is more than the predetermined distance D. Further, as illustrated in FIG. 23, the viewers A and B in FIG. 22 are moving in substantially the same direction. In the case of FIG. 22, the attribute information acquisition unit 14 does not associate the viewers A and B with each other as a group.

Figure 24:
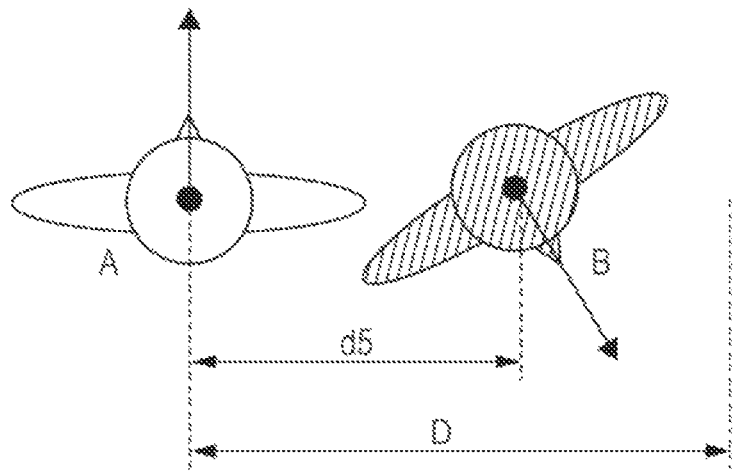
FIG. 24 illustrates a second example illustrating the respective positions of viewers in a relationship not satisfying a rule.
Figure 25:
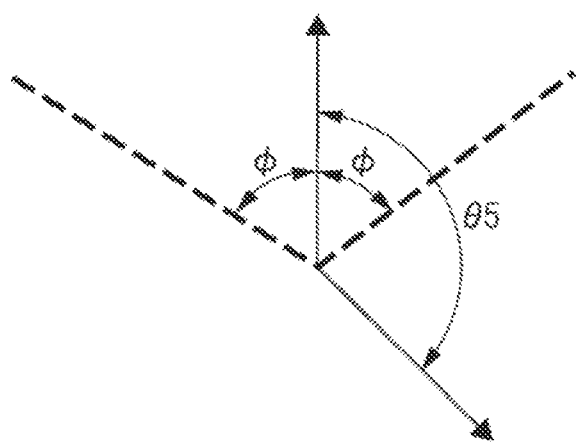
FIG. 25 is a diagram illustrating the respective velocity vectors of the viewers in the example of FIG. 24.

FIG. 24 illustrates a second example illustrating the respective positions of the viewers A and B in a relationship not satisfying the rule. FIG. 25 is a diagram illustrating the respective velocity vectors of the viewers A and B in the example of FIG. 24. In FIG. 24, a distance d5 between the viewers A and B is less than the predetermined distance D. As illustrated in FIG. 25, however, an angle θ5 formed by the velocity vector of the viewer A and the velocity vector of the viewer B in FIG. 24 is more than the predetermined angle φ. In the case of FIG. 24, therefore, the attribute information acquisition unit 14 does not associate the viewers A and B with each other as a group.

If the rule is also previously defined for three or more persons, the attribute information acquisition unit 14 is capable of determining whether or not to associate the persons as a group. In the present embodiment, the direction of the face is detected and included in the conditions. However, it is possible to determine whether or not persons form a group only on the basis of the moving directions and the positions of the persons.

Figure 26:
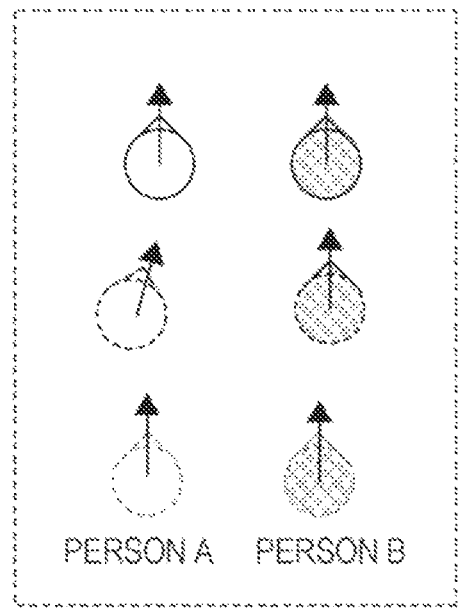
FIG. 26 illustrates an example of the combination of motional states of persons associated as a group.

FIG. 26 illustrates an example of the combination of motional states of persons associated as a group. It is assumed in FIG. 26 that persons A and B are located within a certain predetermined distance from each other, and that the respective moving directions of the persons A and B substantially match each other. In this case, the attribute information acquisition unit 14 associates the persons A and B as a group.

Figure 27:
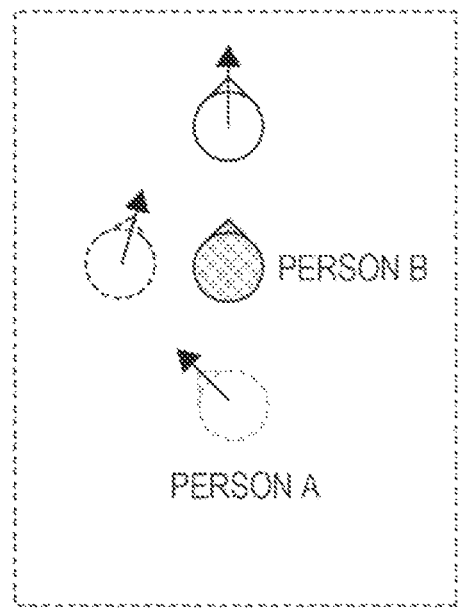
FIG. 27 illustrates an example of the combination of motional states of persons not associated as a group.

FIG. 27 illustrates an example of the combination of motional states of persons not associated as a group. In FIG. 27, the persons A and B are located within a certain predetermined distance from each other, but the respective moving directions and velocity values of the persons A and B do not match each other. In this case, the attribute information acquisition unit 14 does not associate the persons A and B as a group.

Figure 28:
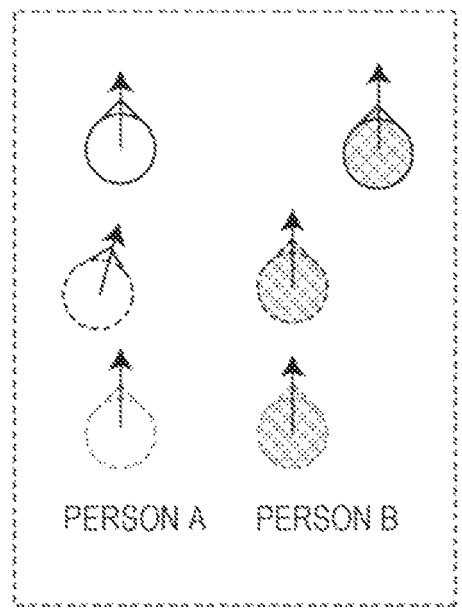
FIG. 28 illustrates an example of the combination of motional states of persons not associated as a group.

FIG. 28 illustrates an example of the combination of motional states of persons not associated as a group. In FIG. 28, the respective moving directions of the persons A and B match each other, but the persons A and B are not located within a certain predetermined distance from each other. In this case, the attribute information acquisition unit 14 does not associate the persons A and B as a group.

Figure 29:
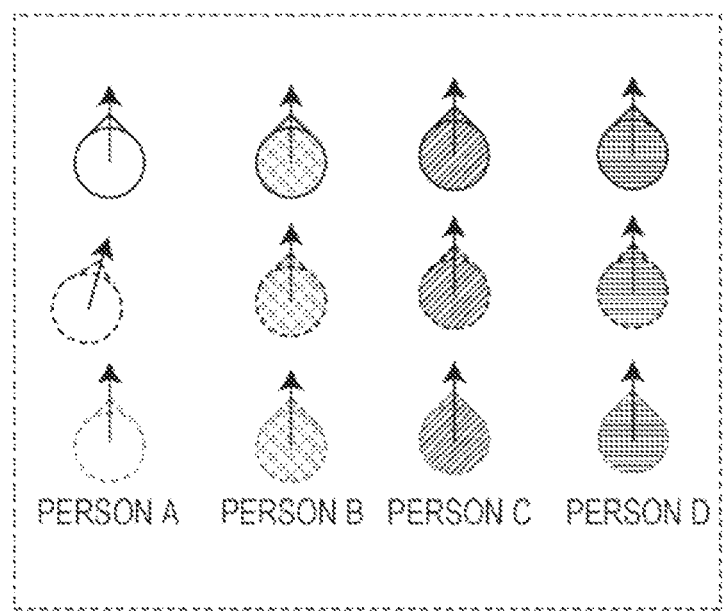
FIG. 29 illustrates an example of the combination of motional states of persons associated as a group.

FIG. 29 illustrates an example of the combination of motional states of persons associated as a group. It is assumed in FIG. 29 that persons A and B, persons B and C, and persons C and D are respectively located within a certain predetermined distance from each other, and that the respective moving directions and velocity values of the persons A, B, C, and D substantially match one another. In this case, the attribute information acquisition unit 14 associates the persons A, B, C, and D as a group. If each of three or more persons of a group is constantly located within a certain specified distance from one of the other persons of the group, and if the respective velocity vector directions of the three or more persons substantially match one another, as in the example of FIG. 29, the attribute information acquisition unit 14 associates all of the persons as a group.

Subsequently, description will be made of the group determination process for a person at rest, which is performed in the process of Step S84 for determining whether or not the rule is satisfied. Whether or not a person at rest belongs to a group can be determined on the basis of, for example, whether or not a plurality of persons are having a conversation or gathering at a location from different directions.

Description will be first made of a process of determining group association when a plurality of viewers are having a conversation. During the period from the time t1 to the time t3, the attribute information acquisition unit 14 identifies the viewer A in the image. Then, the attribute information acquisition unit 14 identifies the viewer B located within the distance represented by the constant R from the viewer A.

If the following conditions are satisfied, the attribute information acquisition unit 14 associates the viewers A and B with each other as a group. The first condition is that the viewers A and B are both at rest at arbitrary timing during the period from the time t1 to the time t3. For example, if the respective velocities of the viewers A and B are both zero, the attribute information acquisition unit 14 determines that the first condition is satisfied.

The second condition is that the angle τ formed by the direction of the face of the viewer A and the vector VAB connecting the position of the viewer A to the position of the viewer B is equal to or less than the predetermined angle ϵ at arbitrary timing during the period from the time t1 to the time t3. The viewers A and B may replace each other in the second condition.

Figure 30:
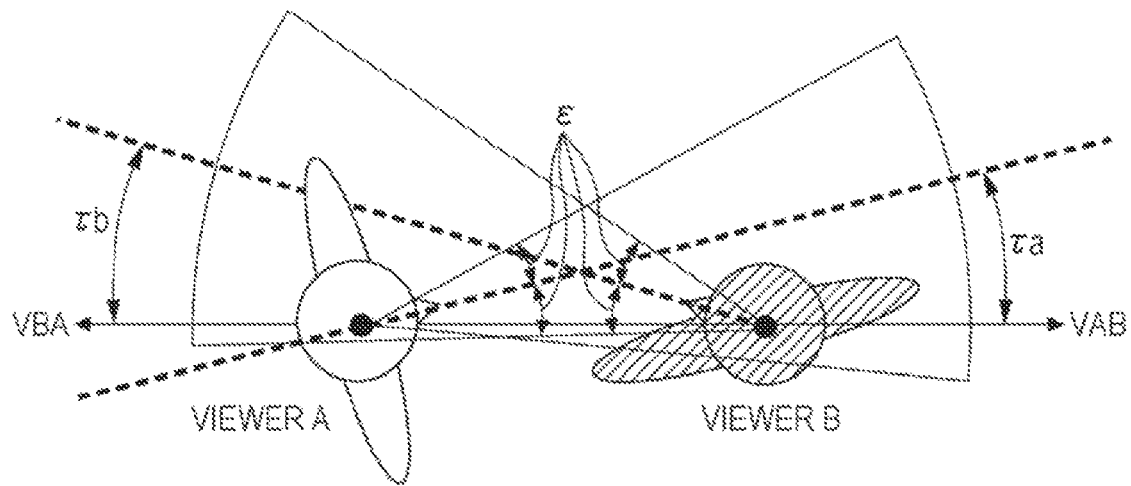
FIG. 30 illustrates an example in which a plurality of viewers are having a conversation.

FIG. 30 illustrates an example in which a plurality of viewers are having a conversation. It is assumed in FIG. 30 that the viewers A and B are both at rest. Thus, the first condition is satisfied. It is further assumed in FIG. 30 that the face of the viewer A and the face of the viewer B face the directions indicated by respective broken lines. The direction of the face of the viewer A forms an angle τa with respect to the vector VAB connecting the viewer A to the viewer B. The direction of the face of the viewer B forms an angle τb with respect to the vector VBA connecting the viewer B to the viewer A. Each of the angles τa and τb is less than the predetermined angle ϵ. It is therefore determined that the viewers A and B are looking in the direction of each other. Thus, the viewers A and B satisfy the second condition.

Figure 31:
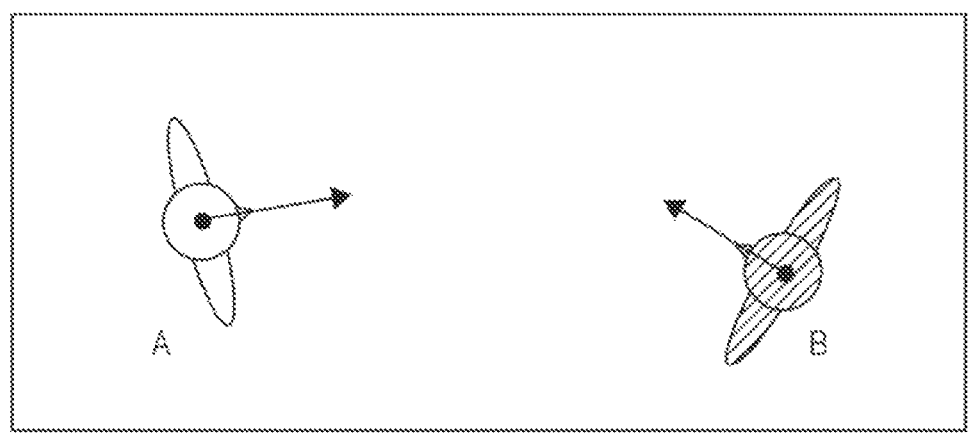
FIG. 31 illustrates an example of a state at a time, in which a plurality of persons gather at a location from different directions.
Figure 32:
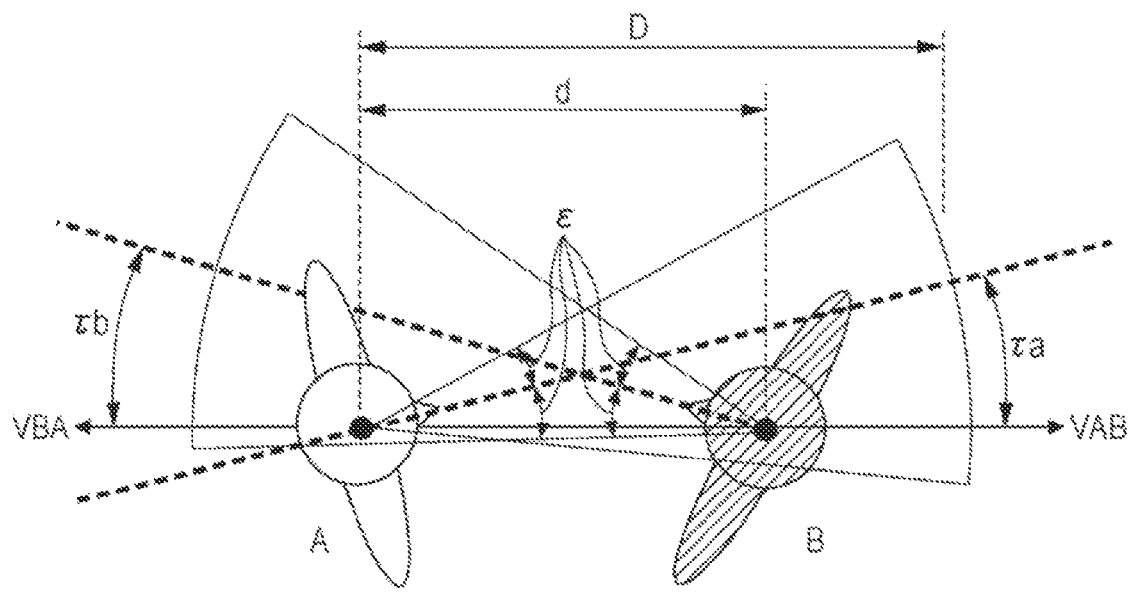
FIG. 32 illustrates an example of a state at another time, in which a plurality of persons gather at a location from different directions.

Subsequently, description will be made of a process of determining group association when a plurality of persons are gathering at a location from different directions. FIG. 31 illustrates an example of a state at the time t1, in which a plurality of persons gather at a location from different directions. FIG. 32 illustrates an example of a state at the time t3, in which a plurality of persons gather at a location from different directions.

The attribute information acquisition unit 14 identifies the viewer A in the image during the period from the time t1 to the time t3. Then, the attribute information acquisition unit 14 identifies the viewer B in the image.

If the following conditions are satisfied, the attribute information acquisition unit 14 associates the viewers A and B with each other as a group. The first condition is that the viewers A and B are moving from different places to a location at the time t1, and are at rest at the time t3. Whether or not the viewers A and B are both at rest at the time t3 is determined on the basis of, for example, the determination by the attribute information acquisition unit 14 of whether or not the viewers A and B both have a velocity of zero at the time t3. Whether or not the viewers A and B are moving from different places to a location at the time t1 is detected in accordance with, for example, the following procedure.

The attribute information acquisition unit 14 identifies the position at which the viewers A and B gather at the time t3. The attribute information acquisition unit 14 identifies a vector connecting the position of the viewer A at the time t1 to the position at which the viewers A and B gather at the time t3. The attribute information acquisition unit 14 determines whether or not the direction of the identified vector matches the moving direction of the viewer A at the time t1.

Further, the attribute information acquisition unit 14 identifies a vector connecting the position of the viewer B at the time t1 to the position at which the viewers B and A gather at the time t3. The attribute information acquisition unit 14 determines whether or not the direction of the identified vector matches the moving direction of the viewer B at the time t1.

The second condition is that the distance d between the viewers A and B at rest at the time t3 is equal to or less than the predetermined distance D. In FIG. 32, D represents a predetermined distance, E represents a predetermined angle, d represents the distance between the viewers A and B, VAB represents the vector from the viewer A to the viewer B, VBA represents the vector from the viewer B to the viewer A, broken lines represent the respective face directions of the viewers A and B, τa represents the angle formed by the direction of the vector VAB and the direction of the face of the viewer A, and τb represents the angle formed by the direction of the vector VBA and the direction of the face of the viewer B. The distance d between the viewers A and B is less than the predetermined distance D. In this case, the attribute information acquisition unit 14 determines that the second condition is satisfied. The viewers A and B may replace each other in the second condition.

The third condition is that the angle τa formed by the direction of the face of the viewer A and the vector VAB connecting the position of the viewer A to the position of the viewer B is equal to or less than the predetermined angle ϵ at the time t3.

In FIG. 32, the angle τa formed by the direction of the face of the viewer A and the vector VAB connecting the position of the viewer A to the position of the viewer B is less than the predetermined angle ϵ. In this case, the attribute information acquisition unit 14 determines that the third condition is satisfied. That is, the angle τa formed by the direction of the face of the viewer A and the vector VAB connecting the position of the viewer A to the position of the viewer B is equal to or less than the predetermined angle ϵ at arbitrary timing.

The fourth condition is that the angle τb formed by the direction of the face of the viewer B and the vector VBA connecting the position of the viewer B to the position of the viewer A is equal to or less than the predetermined angle ϵ at the time t3.

In FIG. 32, the angle τb formed by the direction of the face of the viewer B and the vector VBA connecting the position of the viewer B to the position of the viewer A is less than the predetermined angle ϵ. In this case, the attribute information acquisition unit 14 determines that the fourth condition is satisfied.

It is also possible to previously define a rule for three or more persons, and to associate the three or more persons as a group.

Description will be made of the case of a group of three or more persons. For example, if a viewer C joins the conversation between two viewers A and B, the viewers A, B, and C are treated as a group.

Figure 33:
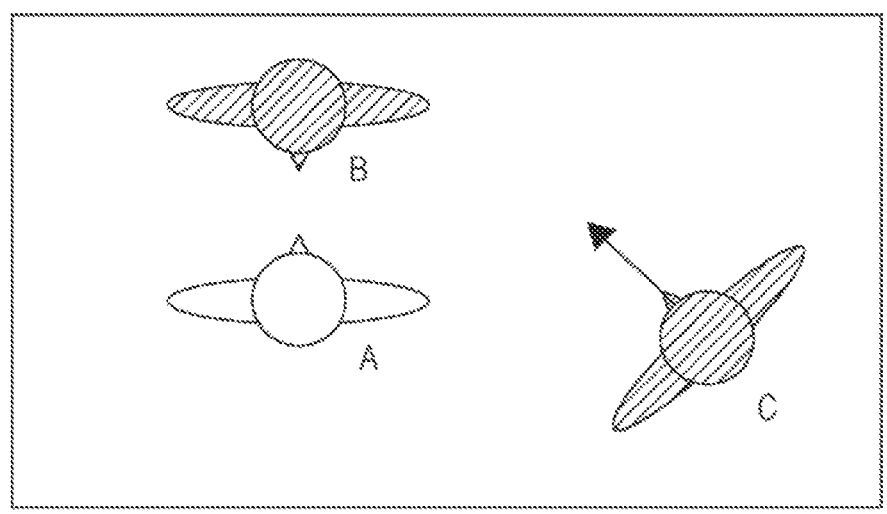
FIG. 33 is a diagram for explaining a state at a time, in which a viewer joins a conversation between two viewers.
Figure 34:
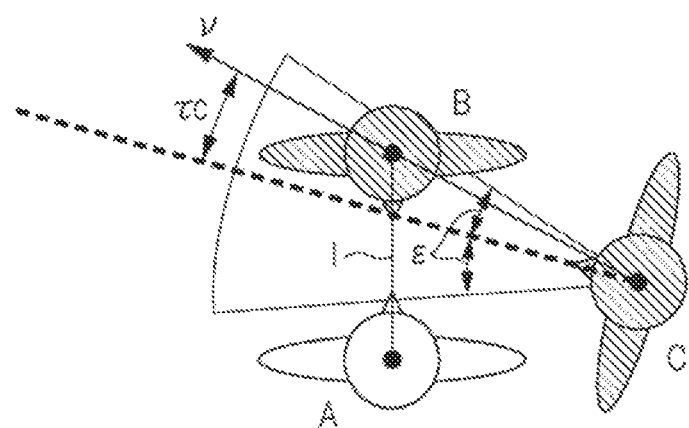
FIG. 34 is a diagram for explaining a state at another time, in which a viewer joins a conversation between two viewers.

FIG. 33 is a diagram for explaining a state at the time t1, in which the viewer C joins the conversation between the two viewers A and B. FIG. 34 is a diagram for explaining a state at the time t3, in which the viewer C joins the conversation between the two viewers A and B. It is assumed that the viewers A and B are associated with each other as a group at the time of the state in FIG. 33.

If the following conditions are satisfied by the viewer C, who approaches within the distance represented by the arbitrary constant R from the viewer A, the attribute information acquisition unit 14 associates the viewer C with the group including the viewers A and B. The first condition is that the viewer C is at rest at the time t3.

The second condition is that the minimum value of the distance d between the viewer C at rest and one of the viewers belonging to the group is equal to or less than the predetermined distance D at the time t3.

The third condition is that the minimum value of the angle τc formed by the direction of the face of the viewer C and a vector connecting the position of the viewer C to the position of one of the viewers belonging to the group is equal to or less than the predetermined angle ε at the time t3. In FIG. 34, an angle τc formed by the direction of the face of the viewer C and a vector vconnecting the position of the viewer C to the position of the viewer B belonging to the group is less than the predetermined angle ε.

The fourth condition is that the direction of the face of the viewer C crosses a line segment l, which connects the viewers belonging to the group, at the time t3. In FIG. 34, the direction of the face of the viewer C crosses the line segment l connecting the viewers A and B belonging to the group.

In the present embodiment, when determining whether or not a person belongs to a group, the content determination device 10 detects the direction of the face of the person. The content determination device 10 may be configured to estimate the direction of the face on the basis of the past moving direction of the viewer. Further, the content determination device 10 may be configured to determine whether or not a person belongs to a group only on the basis of the moving direction and the position of the person, not including the direction of the face in the conditions.

Further, if the distance between the first and second persons is close to a predetermined threshold value of the distance for determining the persons as a group, the distance between the persons may repeatedly vary between a distance exceeding the threshold value and a distance not exceeding the threshold value. In this case, every time the detected distance exceeds or does not exceed the threshold value, the first and second persons may be determined as not forming a group or as forming a group. If so, the displayed content screen may change every time the persons are determined as not forming a group or as forming a group. If the persons are once determined as a group, therefore, the attribute information acquisition unit 14 treats the persons as a group, even if the persons do not satisfy the conditions of the group for a certain time. Similarly, if the persons are once determined as not forming a group, the attribute information acquisition unit 14 treats the persons as different groups, even if the persons satisfy the conditions of the group for a certain time. The certain time may be set to, for example, the display time of a content image.

Process of Acquiring Attribute Information

Subsequently, the process of Step S08 for acquiring the attribute information 99 will be described. If a new person is detected in the image, the attribute information acquisition unit 14 registers a record of the newly detected person in the attribute information 99. To register the record in the attribute information 99, the attribute information acquisition unit 14 assigns the newly detected person a viewer ID. The attribute information acquisition unit 14 acquires the attribute of the person assigned with the viewer ID, and performs the process of registering the attribute in the attribute information 99. If a change in motional state occurs, the attribute information acquisition unit 14 partially updates the attribute information 99.

An example of the method of acquiring the attribute information 99 through image processing will be described below.

For example, when the attribute information acquisition unit 14 acquires the height of a viewer, the second photographing unit 22 is installed which is capable of photographing the area photographed from obliquely upward by the photographing unit 11. The second photographing unit 22 may be installed at an installation position allowing the second photographing unit 22 to photograph, in a lateral direction, a person in the area photographed by the photographing unit 11. The attribute information acquisition unit 14 is assumed to be capable of associating the person in the image photographed by the photographing unit 11 with the person in the image photographed by the second photographing unit 22 through a geometric operation. For example, the attribute information acquisition unit 14 estimates the clothes of a person on the basis of information such as the shape and color of the clothes of the person in the image photographed by the second photographing unit 22 and previously stored information of the shapes and colors of clothes. The clothes include, for example, "suit," "casual," and "colorful" types, and are previously categorized and stored by the administrator in accordance with the shape and color of the clothes. Further, the attribute information acquisition unit 14 estimates the sex and the age group of the person on the basis of the clothes, the hairstyle, the height, and so forth of the person. Similarly, the attribute information acquisition unit 14 estimates the individual attribute of the person on the basis of the clothes, the height, the sex, and so forth of the person. To enable these estimations, the administrator previously defines the categorized information of the appearances of persons, and the attribute information acquisition unit 14 determines whether or not the appearance of the person in the image photographed by the second photographing unit 22 matches any of the categories. If the appearance of the person matches any of the categories, the attribute information acquisition unit 14 assumes that the person belongs to the category.

Further, when the attribute information acquisition unit 14 acquires the height of a viewer, the second photographing unit 22 may be installed which is capable of photographing the area photographed from obliquely upward by the photographing unit 11. In this case, the second photographing unit 22 may be installed at an installation position allowing the second photographing unit 22 to photograph, in a lateral direction, a person in the area photographed by the photographing unit 11. The attribute information acquisition unit 14 estimates the height of the person through geometric calculation on the basis of the installation position of the second photographing unit 22, the position of the detected viewer, and the size in the height direction of the person in the image photographed by the second photographing unit 22. The attribute information acquisition unit 14 identifies the person on the basis of the relationship between the position of the person in the moving image photographed by the second photographing unit 22 and the position of the person in the image photographed by the photographing unit 11. The attribute information acquisition unit 14 associates the person in the image photographed by the photographing unit 11 with the person in the image photographed by the second photographing unit 22 through a geometric operation.

It is also possible to allow the attribute information acquisition unit 14 to acquire the attribute information 99 of each person by causing a not-illustrated RFID reader to read information stored in an RFID device already possessed by the person and having registered information such as "individual attribute," "sex," "age group," and "clothes."

The attribute information acquisition unit 14 stores the acquired record of the attribute information 99 in the attribute information holding unit 18.

At Step S08, the attribute information acquisition unit 14 also performs the process of acquiring the group attribute of the group attribute information 98. In accordance with predetermined conditions, the attribute information acquisition unit 14 identifies the attribute of the group on the basis of the attribute information 99 of each of the persons forming the group, which has been obtained by the group association process of Step S07. The conditions are formed by the combination of the attribute information, the position information, and so forth of the persons forming the group. For example, the administrator previously defines "parent and child" as a group formed by persons corresponding to the age group of adult and the age group of child, and "couple" as a group formed by persons determined as a female and a male moving while being constantly close to each other within a predetermined distance.

The attribute information acquisition unit 14 reads the attribute information 99 of each of the persons forming the group. If the read age groups of the persons are adult and child, the attribute information acquisition unit 14 determines the persons as "parent and child" on the basis of the predefined conditions. Further, if the persons forming the group are a female and a male, and if the persons are moving while being constantly close to each other within a predetermined distance, the attribute information acquisition unit 14 determines the persons as "couple." If the group does not correspond to any of the preset patterns of combination, the attribute information acquisition unit 14 registers the group attribute of the group as unknown.

The attribute information acquisition unit 14 stores the determined group attribute information 98 in the attribute information holding unit 18 in association with the group ID.

Measurement of Gaze Information

Subsequently, description will be made of a process of determining whether or not a person is gazing at a content image. The content determination device 10 acquires gaze information. The gaze information refers to the information indicating whether or not a viewer has gazed at an image. The method of acquiring the gaze information includes a method of acquiring the gaze information by manipulating the projection position of the content image and a method of acquiring the gaze information by using a method of acquiring the direction of the eyes of a person or a method of detecting the direction of the face of a person.

Description will be first made of the method of acquiring the gaze information by manipulating the projection position of the content image.

To acquire the gaze information by manipulating the projection position of the content image, the content determination device 10 intentionally shifts the projection position of the content image from the original projection position. The content determination device 10 determines whether or not a person has gazed at the content image on the basis of whether or not the movement of the person has followed the content image as a result of the shift of the content image. Consequently, the content determination device 10 acquires the gaze information. If the content image is presented to a group, the gaze information measurement unit 12 measures the gaze information of each of the persons forming the group.

The image photographed by the photographing unit 11 is used as the image capturing the motion of a person. The minimum number of cameras newly installed and used to acquire the gaze information is one. The cameras are installed at respective installation positions at which the directions of the cameras are the same as the projection direction of a projector. The photographing ranges of the cameras are set such that the combination of the photographing ranges of all of the cameras includes the entire area in which images are projected.

To acquire the gaze information in accordance with the present method, the second photographing unit 22 for photographing the motion of a person functions.

Figure 35:
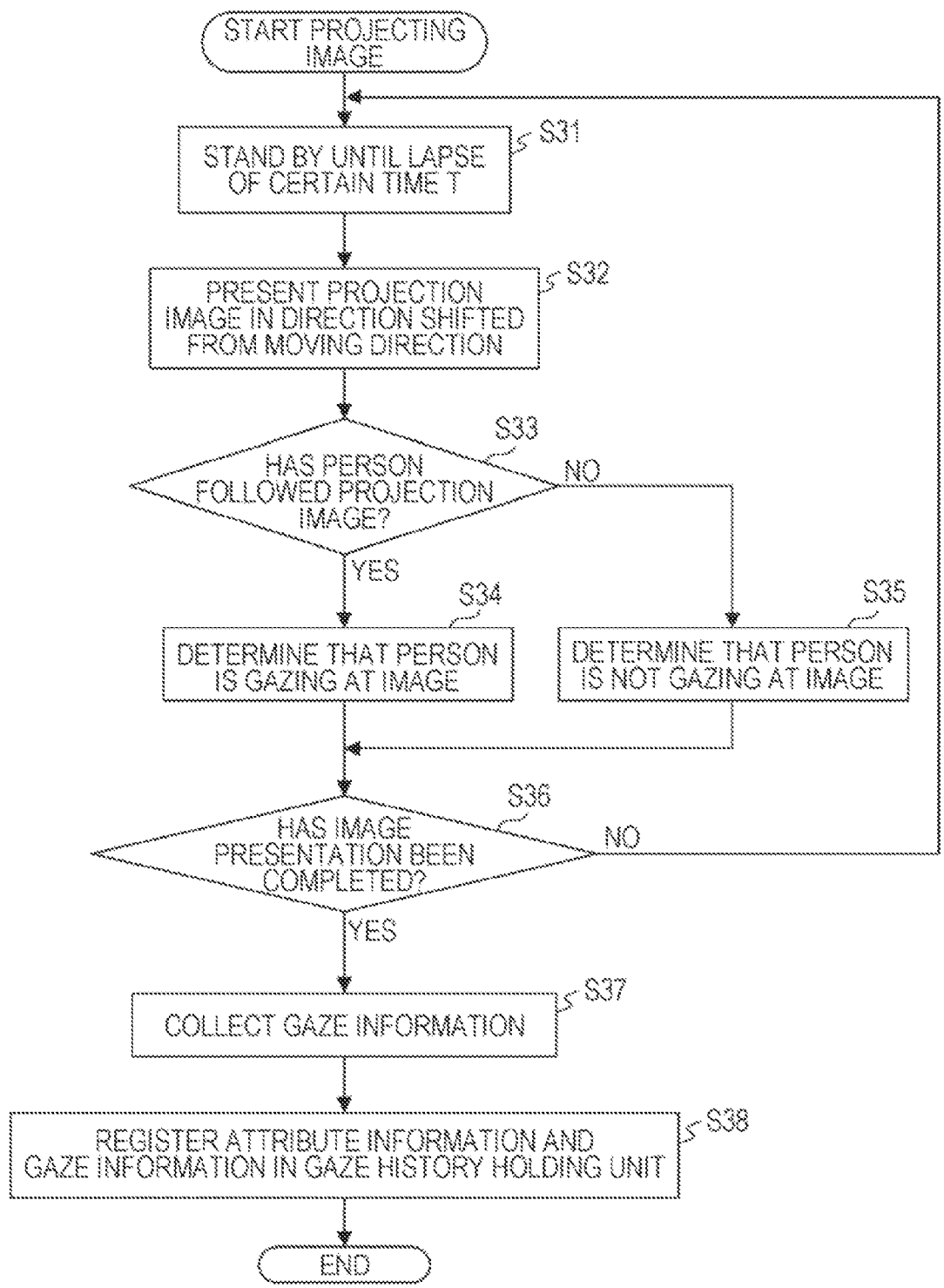
FIG. 35 is a flowchart of a process of acquiring gaze information.

The process of acquiring the gaze information will be described below. FIG. 35 is a flowchart of the process of acquiring the gaze information. The gaze information measurement unit 12 performs the process of acquiring the gaze information in a period of certain time T.

After the start of projection of a content image to a viewer, the gaze information measurement unit 12 stands by for the certain time T (Step S31). The system administrator previously sets the certain time T. The shorter the certain time T is, the more accurately the gaze information can be acquired.

After the lapse of the certain time T, the gaze information measurement unit 12 manipulates the projection position of the image. The gaze information measurement unit 12 projects the content image at a position shifted from the moving direction of the viewer (Step S32).

Herein, the manipulation of the projection position will be described. The content determination device 10 predicts and determines, on the basis of the motion of the viewer, the position to which the content image will be projected. The position to which the content determination device 10 will project the content image will be hereinafter referred to as the predicted projection position. The predicted projection position is normally located in the moving direction of the viewer. The moving direction of the viewer corresponds to the direction of the velocity vector of the viewer. The gaze information measurement unit 12 changes the projection position from the predicted projection position.

When changing the projection position in a lateral direction with respect to the viewer, the gaze information measurement unit 12 changes the projection position such that the angle formed by a line connecting the position of the viewer and the changed projection position of the content image and the velocity vector of the viewer is equal to or less than 90 degrees.

When changing the projection position in an anteroposterior direction with respect to the viewer, the gaze information measurement unit 12 changes the projection position such that the distance between the changed projection position and the viewer is neither excessively distant from the viewer nor excessively close to the viewer. For example, when changing the projection position in a direction of separating the content image from the viewer, the gaze information measurement unit 12 changes the projection position such that the distance between the changed projection position and the viewer is equal to or less than twice the distance between the predicted projection position and the viewer. Meanwhile, when changing the projection position in a direction of moving the content image toward the viewer, the gaze information measurement unit 12 changes the projection position such that the distance between the changed projection position and the viewer is equal to or more than half the distance between the predicted projection position and the viewer.

If the projection position of the content image is changed in a lateral direction, the content determination device 10 stores, as the moving direction of the viewer, the direction from the position of the viewer at the time of the change toward the center position of the changed projection position of the content image. In the subsequent projection process, the projection position is determined on the basis of the changed moving direction of the viewer. Further, if the projection position of the content image is changed in an anteroposterior direction, the content determination device 10 stores, as the moving velocity of the viewer, the distance from the position of the viewer at the time of the change to the center position of the changed projection position of the content image. In the subsequent projection process, the projection position is determined on the basis of the changed velocity of the viewer.

After the lapse of an appropriate time t less than the certain time T, the gaze information measurement unit 12 performs the gaze determination.

Figure 36:
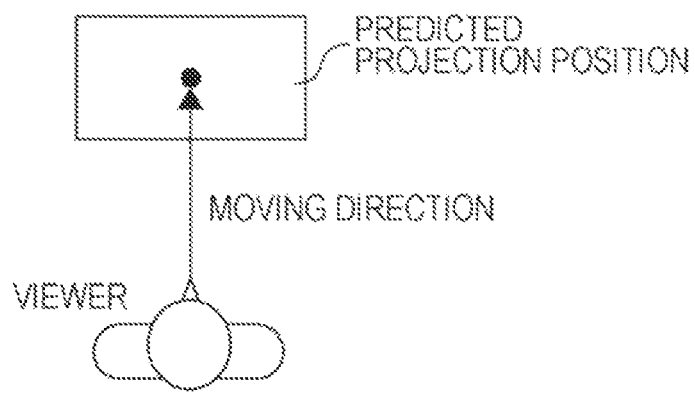
FIG. 36 illustrates a state prior to a change in projection position of a content image.
Figure 37:
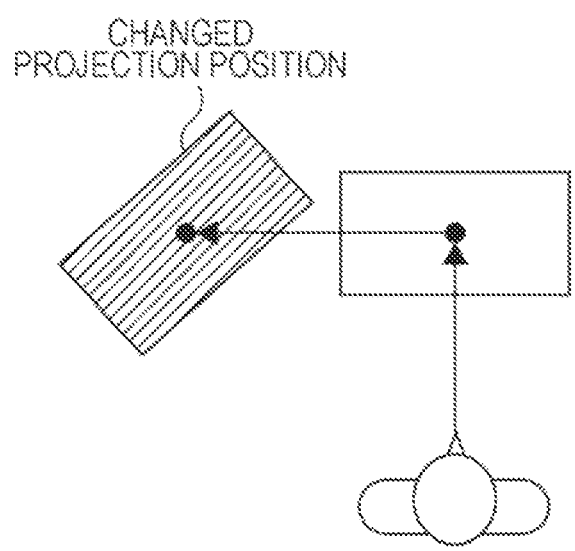
FIG. 37 illustrates a state in which the projection position has been changed in a lateral direction with respect to the moving direction of a viewer.
Figure 38:
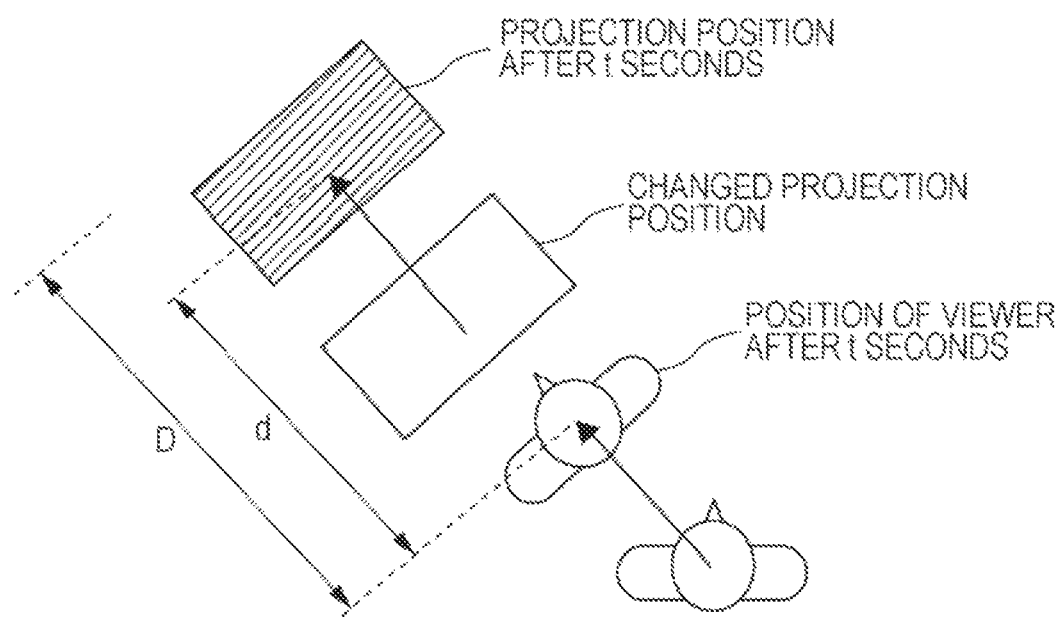
FIG. 38 illustrates a state in which an appropriate time less than a certain time has elapsed after the change in projection position of the content image from the position in FIG. 36 to the position in FIG. 37.

FIGS. 36 to 42 are diagrams for explaining the relationship between the change in projection position of the content image and the following of the content image by the viewer. FIG. 36 illustrates a state prior to the change in projection position of the content image. FIG. 37 illustrates a state in which the projection position has been changed in a lateral direction with respect to the moving direction of the viewer. The gaze information measurement unit 12 changes the projection position of the content image in FIG. 36 to the projection position in FIG. 37. FIG. 38 illustrates a state in which the appropriate time t less than the certain time T has elapsed after the change in projection position of the content image from the position in FIG. 36 to the position in FIG. 37. In FIG. 38, the distance between the content image and the viewer has also been changed to be more than the distance between the content image and the viewer prior to the change in projection position. In FIG. 38, the moving direction of the changed projection position and the moving direction of the viewer are the same.

Further, in FIG. 38, the distance d is less than the predetermined distance D. This indicates that the viewer increases his/her moving velocity to follow the content image, which has been intentionally projected to a distant position from the viewer by the gaze information measurement unit 12. In this case, the moving direction of the viewer and the moving direction of the content image are the same, and the moving velocity of the viewer and the moving velocity of the content image are the same. Therefore, the gaze information measurement unit 12 determines that the viewer is gazing at the image.

Figure 39:
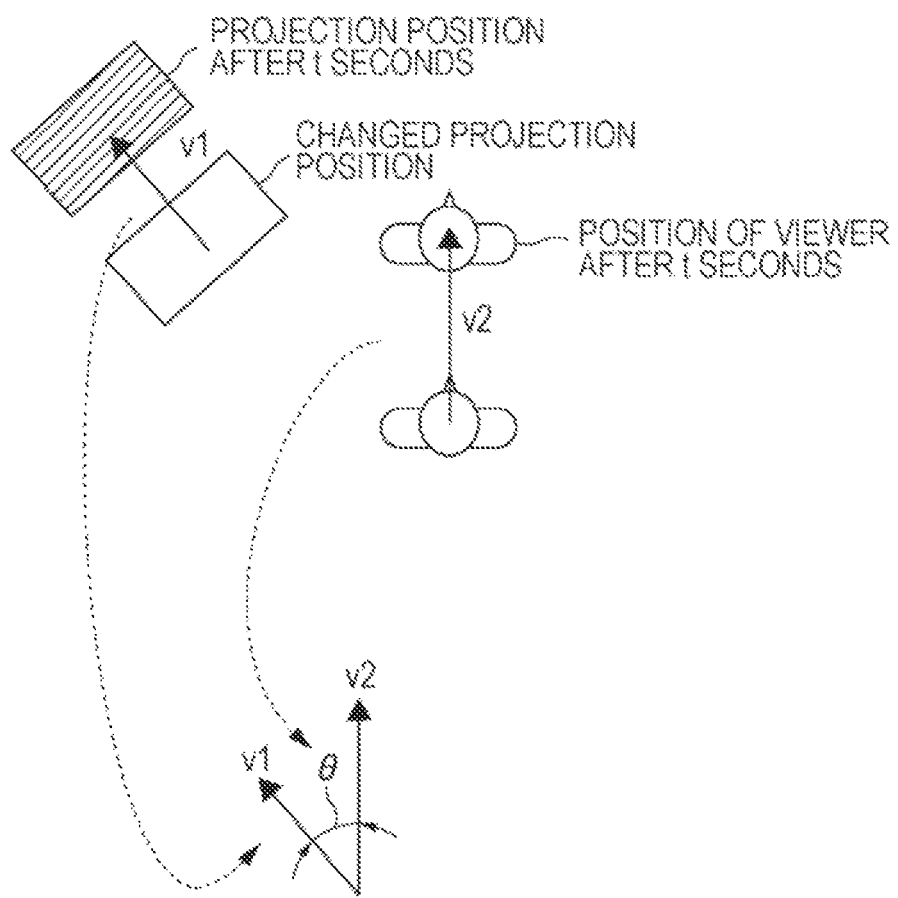
FIG. 39 illustrates another example of a state in which an appropriate time less than a certain time has elapsed after the change in projection position of the content image from the position in FIG. 36 to the position in FIG. 37.

Meanwhile, FIG. 39 illustrates another example of the state in which the appropriate time t less than the certain time T has elapsed after the change in projection position of the content image from the position in FIG. 36 to the position in FIG. 37. In FIG. 39, a moving direction v1 of the changed projection position and a velocity direction v2 of the viewer do not face the same direction. In this case, the gaze information measurement unit 12 determines that the viewer is not gazing at the image.

Figure 40:
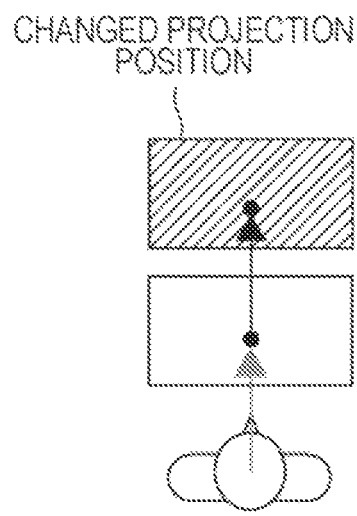
FIG. 40 illustrates a state in which the projection position of the content image in FIG. 36 has been changed to a position separating from the viewer.
Figure 41:
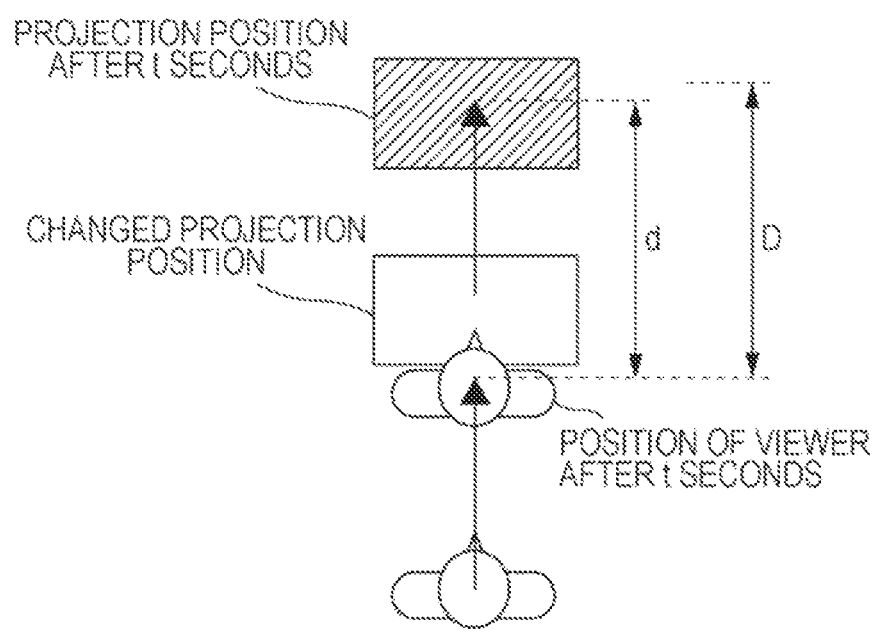
FIG. 41 illustrates a state in which an appropriate time less than a certain time has elapsed after the change in projection position from the position in FIG. 36 to the position in FIG. 40.
Figure 42:
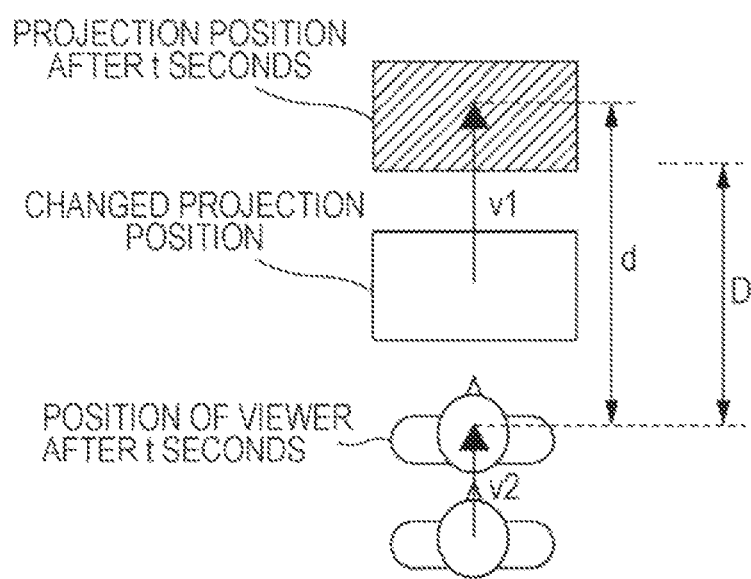
FIG. 42 illustrates another state in which an appropriate time less than a certain time has elapsed after the change in projection position from the position in FIG. 36 to the position in FIG. 40.

Further, FIGS. 40 to 42 illustrate examples in which the projection position is changed along the moving direction of the viewer. FIG. 40 illustrates a state in which the projection position of the content image in FIG. 36 has been changed to a position separating from the viewer.

FIG. 41 illustrates a state in which the appropriate time t less than the certain time T has elapsed after the change in projection position from the position in FIG. 36 to the position in FIG. 40. In FIG. 41, the moving direction of the changed projection position and the velocity direction of the viewer face the same direction. Further, in FIG. 41, the distance d between the viewer and the content image is less than the predetermined distance D. In this case, the gaze information measurement unit 12 determines that the viewer is gazing at the image.

FIG. 42 illustrates another state in which the appropriate time t less than the certain time T has elapsed after the change in projection position from the position in FIG. 36 to the position in FIG. 40. In FIG. 42, the moving direction v1 of the changed projection position and the velocity direction v2 of the viewer face the same direction. In FIG. 42, however, the distance d between the viewer and the content image is more than the predetermined distance D. In this case, the gaze information measurement unit 12 determines that the viewer is not gazing at the image.

For example, after the change in projection position of the content image, the cameras photograph the image covering the projection area. The gaze information measurement unit 12 determines whether or not a person in the photographed image has followed the content image (Step S33).

If the projection position of the content image has been changed in a lateral direction with respect to the moving direction of the viewer, and if the moving direction of the content image changed in projection position and the moving direction of the viewer are substantially the same after the lapse of the time t, the gaze information measurement unit 12 determines that the viewer has followed the content image. On the basis of whether or not the angle formed by the moving direction vector of the content image and the moving direction vector of the viewer is equal to or less than a certain predetermined angle, the gaze information measurement unit 12 determines whether or not the viewer and the content image are the same in direction.

Further, if the projection position of the content image has been changed in an anteroposterior direction with respect to the moving direction of the viewer, and if the distance between the projection position and the position of the viewer is within a predetermined distance according to the velocity of the viewer after the lapse of the time t, the gaze information measurement unit 12 determines that the viewer has followed the content image.

If the person in the photographed image has followed the content image (YES at Step S33), the gaze information measurement unit 12 determines that the person is gazing at the content image (Step S34). Meanwhile, if the person in the photographed image has not followed the content image (NO at Step S33), the gaze information measurement unit 12 determines that the person is not gazing at the content image (Step S35).

Then, the gaze information measurement unit 12 determines whether or not the presentation of the content image has been completed (Step S36). Each content image is assigned with a presentation time, e.g., 15 seconds or 30 seconds. If the presentation of the content image has not been completed (NO at Step S36), the gaze information measurement unit 12 performs the determination of whether or not the person is gazing at the content image, at intervals of the certain time T until the completion of the content image.

If the presentation of the content image has been completed (YES at Step S36), the gaze information measurement unit 12 collects the gaze information (Step S37). The gaze information measurement unit 12 calculates the gaze rate as the result of collection of the gaze information. The gaze rate is the rate of gaze at a content image by a person, which is represented by a numerical value expressed as a real number ranging from 0 to 1. The gaze information measurement unit 12 calculates the gaze rate in accordance with, for example, the following formula. When the time of gaze is measured, the gaze information measurement unit 12 calculates the gaze rate in accordance with the formula (2).

$$\text{Gaze Rate} = \frac{\text{Time of Gaze}}{\text{Total Reproduction Time of Video}} \quad (2)$$

The gaze rate of the formula (2) represents the rate of the time of gaze at a content image by a person to the total reproduction time of the content image. When the gaze rate is measured in terms of time, measurement may be continuously, but it is possible to accurately measure the gaze rate. Further, when the number of gazes is measured, the gaze information measurement unit 12 calculates the gaze rate in accordance with the formula (3).

$$\text{Gaze Rate} = \frac{\text{Number of Determinations of Gaze}}{\text{Number of Measurements}} \quad (3)$$

The gaze rate of the formula (3) represents the rate of the number of determinations of gaze at a content image by a person to the total number of measurements carried out during the reproduction time of the content image. When the gaze rate is calculated in terms of number, the load on the measurement process is low, but the accuracy of determining whether or not the person has gazed at the content image is reduced.

The gaze information measurement unit 12 stores the gaze rate and the attribute information of the viewer in the gaze history holding unit 17 in association with each other (Step S38).

Subsequently, description will be made of the method of acquiring the gaze information by using the detection of the face of a person.

The gaze information is acquired through the acquisition of the direction of the face of a person from a moving image and the estimation of the direction of the eyes. For example, a camera is installed at a position allowing the camera to photograph the face of a person.

Figure 43:
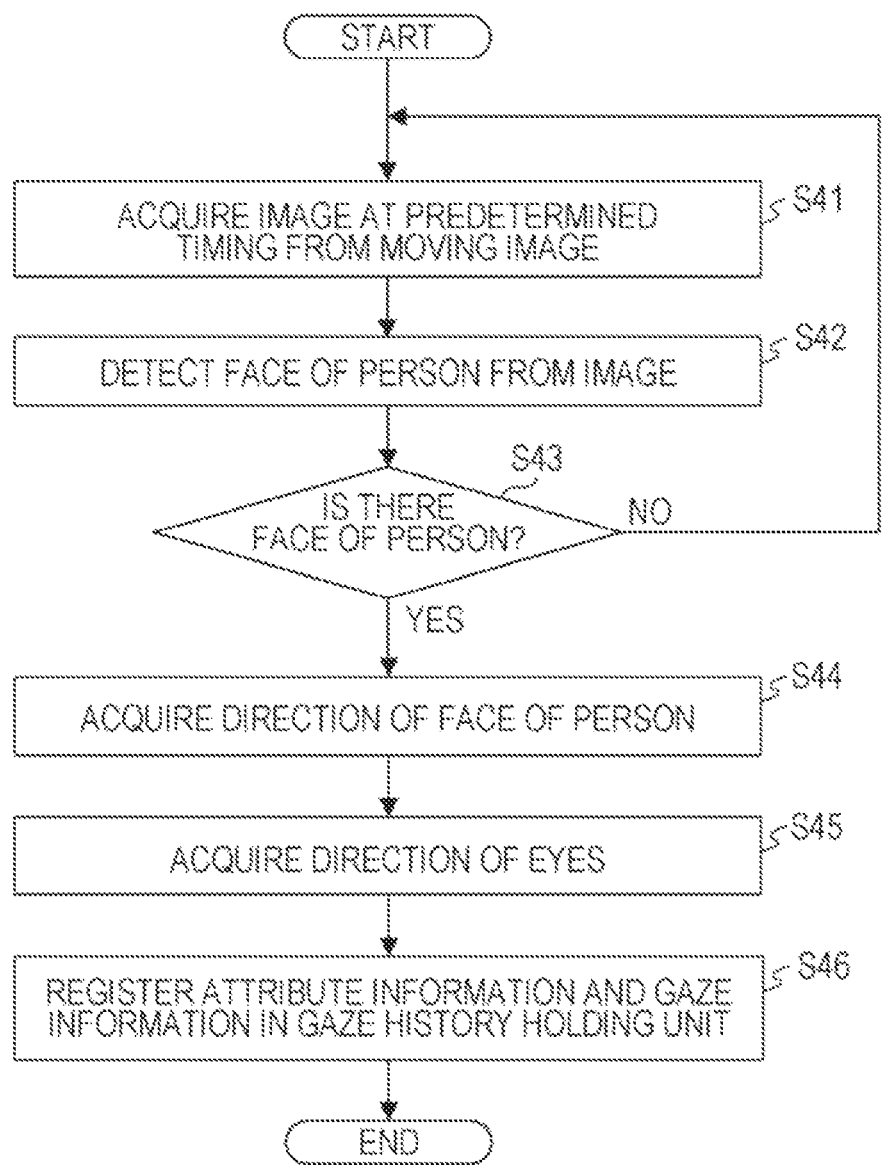
FIG. 43 is a flowchart of a process of determining whether or not a person is gazing at a content image.

FIG. 43 is a flowchart of a process of determining whether or not a person is gazing at a content image.

The gaze information measurement unit 12 acquires an image from the camera (Step S41). As for the image acquisition timing, images may be continuously acquired during the presentation of a content image, or may be discretely acquired at arbitrary times during the display time of the content image.

The gaze information measurement unit 12 detects a face portion of a person from the image acquired at Step S41 (Step S42).

The gaze information measurement unit 12 determines whether or not the face of a person has been detected at Step S42 (Step S43). For example, the gaze information measurement unit 12 performs image processing on the image acquired at Step S41 and extracts a grayscale view, edge information, and color information of the image, to thereby determine whether or not the face has been detected in the image.

If the face has not been detected in the image (NO at Step S43), the gaze information measurement unit 12 again performs the process of Step S41 for acquiring an image. Meanwhile, if the face has been detected in the image (YES at Step S43), the gaze information measurement unit 12 extracts the direction of the face of the person in the image (Step S44).

The camera identifies the face of the person in the image. The face of a person includes a convex nose located at the center thereof. Therefore, on the basis of the information of the position of the nose in the face portion and the centroid of a flesh-colored area in the image, the direction of the face of the person in the image is estimated. On the basis of the estimated direction of the face, the horizontal position of the person in the projection area, and the height position of the face portion of the person, the position being gazed at by the person is identified through geometric calculation.

Further, if the direction of the eyes can be detected, the direction of the eyes may be additionally used in the geometric calculation. For example, the gaze information measurement unit 12 detects the position and direction of the eyes from the position of the face, and three-dimensionally detects the direction of the eyes, to thereby extract the direction of the eyes.

The gaze information measurement unit 12 acquires the gaze information (Step S45). Specifically, the gaze information measurement unit 12 acquires the information indicating whether or not the person is gazing at the content image. For example, if the content image is present in the direction of the face or the eyes of the person, the gaze information measurement unit 12 determines that the person is gazing at the content image. The gaze information measurement unit 12 temporarily stores the gaze information.

The above-described processes of Steps S41 to S45 are performed until the completion of the content image. For example, after the completion of the display of a content image, the gaze information measurement unit 12 calculates the gaze rate representing the rate of gaze at the completed content image by the person. The gaze information measurement unit 12 reads the gaze information temporarily stored at Step S45, and calculates the rate of gaze at the content image.

If a plurality of groups are present in the projection area, and if different content images are displayed to the respective groups, a person A in the first group may gaze at the content image presented to the second group. In such a case, it is possible to store the gaze rate of the person A as a record of the gaze rate of the content image presented to the second group.

The gaze information measurement unit 12 stores the gaze history information 97 in the gaze history holding unit 17 (Step S46).

Determination of Content Image to be Presented

Subsequently, description will be made of a process of determining the content image to be presented to each group. It is assumed in the present embodiment that the content image selection unit 15 performs the process of determining the content image every time the switching of content images occurs. The content image selection unit 15 may determine, before the presentation of a content image is completed, the next content image. In the present embodiment, the content image selection unit 15 performs, for each group, the process of determining the content image.

Figure 44:
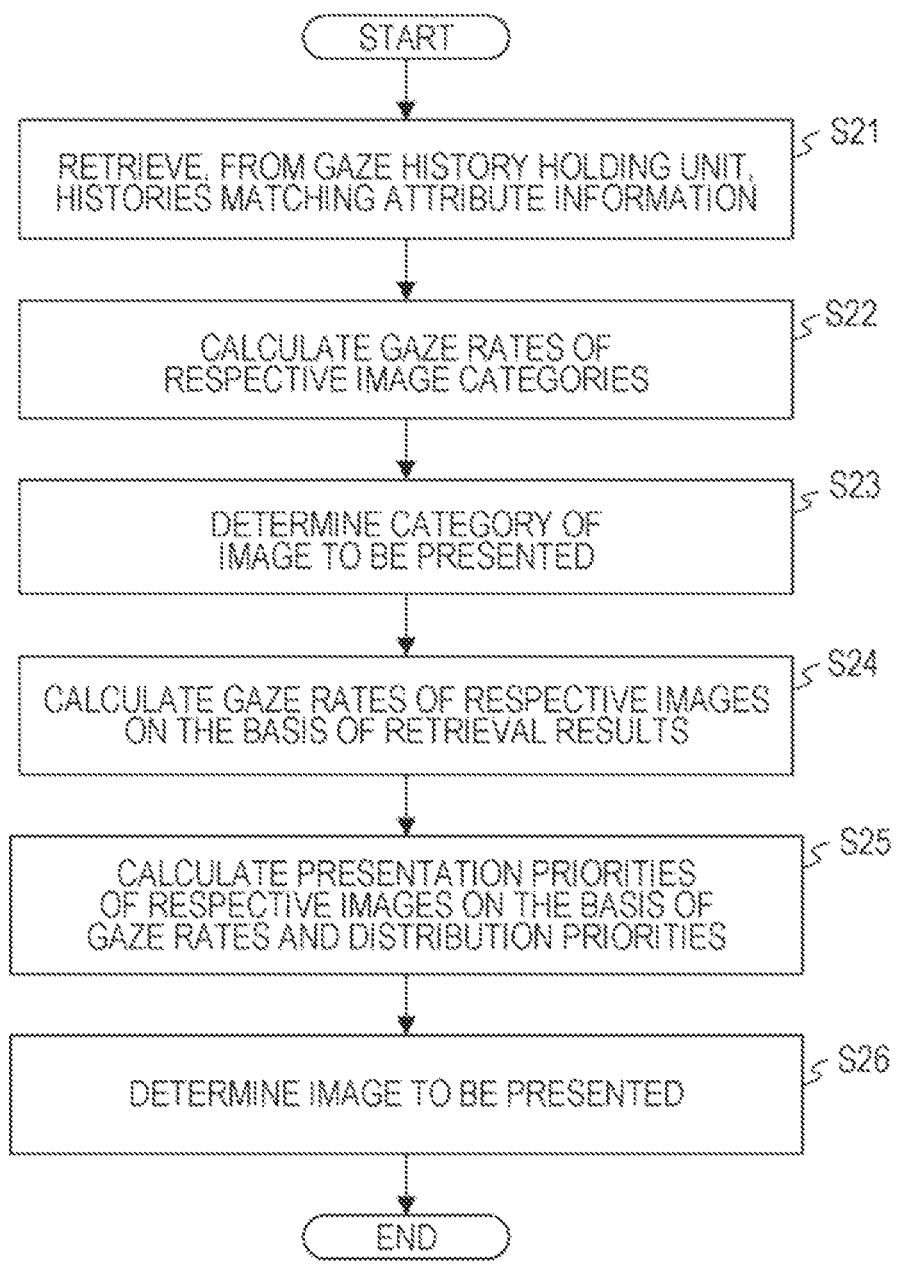
FIG. 44 is a flowchart of a process of determining a content image to be presented.

FIG. 44 is a flowchart of the process of determining the content image to be presented.

The content image selection unit 15 first identifies the group to which the content image is to be presented. Then, the content image selection unit 15 retrieves, from the gaze history information 97, records of the date and time information close to the present date and time and the group attribute information matching the attribute of the present target group to be subjected to the process (Step S21). The administrator previously sets conditions, such as exact match or partial match of the search item.

The content image selection unit 15 calculates, for each of the content images retrieved at Step S21, the gaze rate of the corresponding category of the content image (Step S22).

Figure 45:
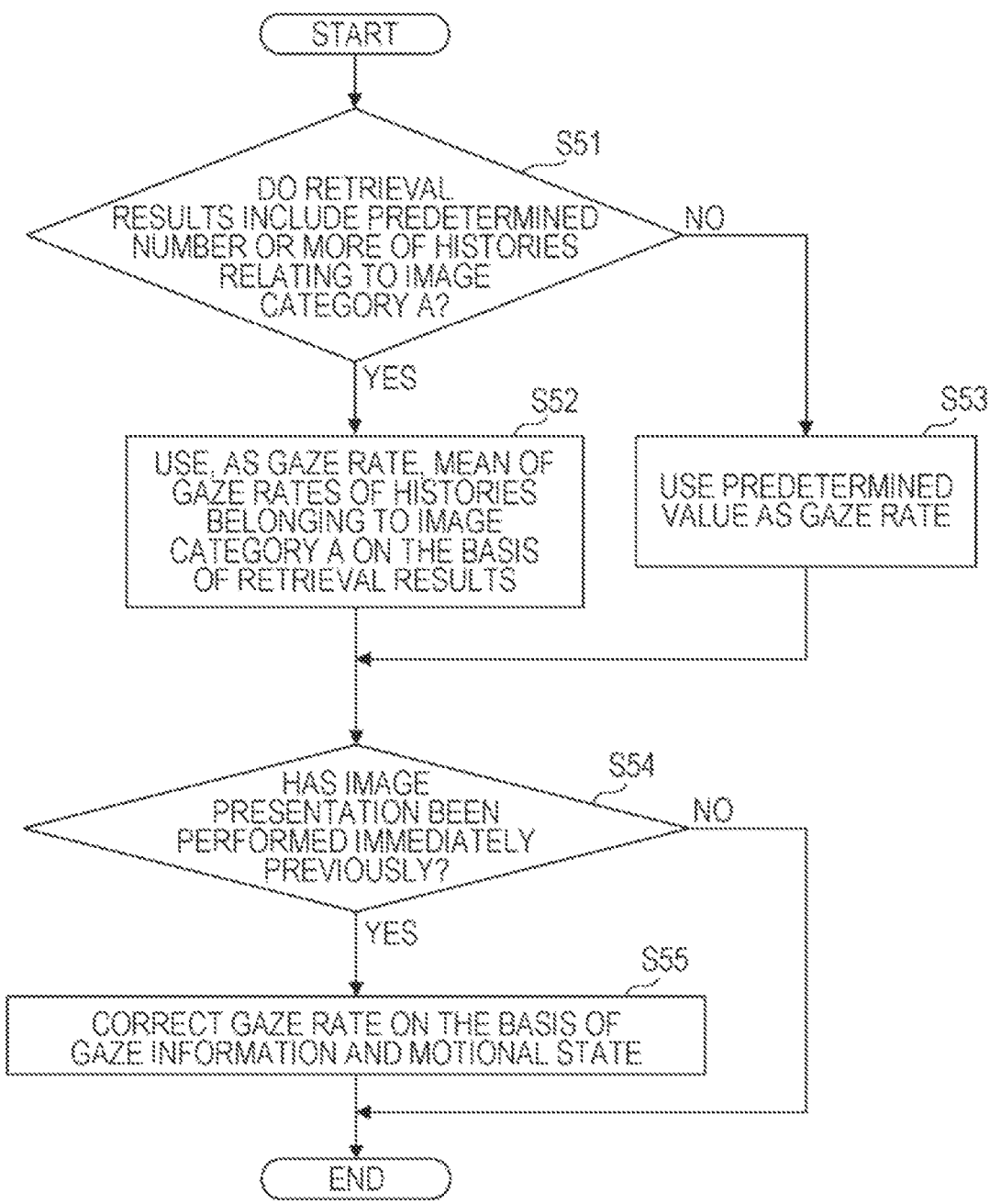
FIG. 45 is a flowchart of a process of calculating the gaze rate of each category of content images.

FIG. 45 is a flowchart of a process of calculating the gaze rate of each category of content images. In the present flowchart, the target category, the gaze rate of which is to be calculated, is referred to as the "category A."

The content image selection unit 15 determines whether or not the content images included in the results of retrieval at Step S21 include a predetermined number or more of histories relating to the content images included in the category A (Step S51).

If the content images include the predetermined number or more of histories relating to the content images included in the category A (YES at Step S51), the content image selection unit 15 calculates, on the basis of the retrieval results, the mean value of the gaze rates of the content images belonging to the category A. The content image selection unit 15 determines the calculated mean value as the gaze rate of the image category A (Step S52).

For example, the content image selection unit 15 calculates a gaze rate $G_C$ of the category A in accordance with the following formula.

$$G_C = \frac{1}{n}\sum_{i=1}^{n} g_i \qquad (4)$$

$G_C$: Gaze Rate of Image Category $g_i$: Gaze Information (Gaze Rate) of History $i$ $n$: Total Number of Histories Relating to Image Category A $$\text{Gaze Rate} = \frac{\text{Number of Determinations of Gaze}}{\text{Number of Measurements}}$$

In the above-described formula, $G_C$ represents the gaze rate of the image category, $g_i$ represents the gaze rate of the history of each of the content images included in the retrieval results, and n represents the total number of the content images included in the image category A.

Meanwhile, if the number of the histories relating to the content images included in the category A is less than the predetermined number (NO at Step S51), the content image selection unit 15 uses a predetermined value as the gaze rate. The predetermined gaze rate may be previously set for each category by the administrator. Alternatively, a single value may be used by all categories as the predetermined gaze rate.

Further, the content image selection unit 15 determines whether or not the presentation of a content image has been performed immediately previously (Step S54).

If the presentation of a content image has been performed immediately previously (YES at Step S54), the content image selection unit 15 corrects the gaze rate on the basis of the gaze information of the presented content image (Step S55). This is because displaying another content image included in the same category including the immediately previously presented content image is considered effective for a viewer in some cases. For example, if a viewer has gazed at the immediately previously presented content image of the category A, the content image selection unit 15 can adjust the gaze rate of the category A to the value of 1 (maximum value). Meanwhile, if the viewer has not gazed at the immediately previously presented content image of the category A, the content image selection unit 15 can reduce the gaze rate of the category A. Further, if the moving viewer stops, the content image selection unit 15 can select a category similar to the category of the immediately previously presented content image. If the moving velocity of the viewer is increased, the content image selection unit 15 can reduce the gaze rate of the category. The content image selection unit 15 calculates the gaze rate for all categories.

Then, the content image selection unit 15 determines the category of the content image to be presented (Step S23). For example, the content image selection unit 15 determines, as the category of the content image to be presented, a category having the highest one of the gaze rates calculated at Step S22. If a plurality of image categories correspond to the highest gaze rate, for example, the content image selection unit 15 selects an image category having a high distribution priority determined by a distributor. Further, the content image selection unit 15 can preferentially select content images covering a plurality of categories.

Then, the content image selection unit 15 determines the gaze rates of the content images belonging to the category selected at Step S23 (Step S24).

Figure 46:
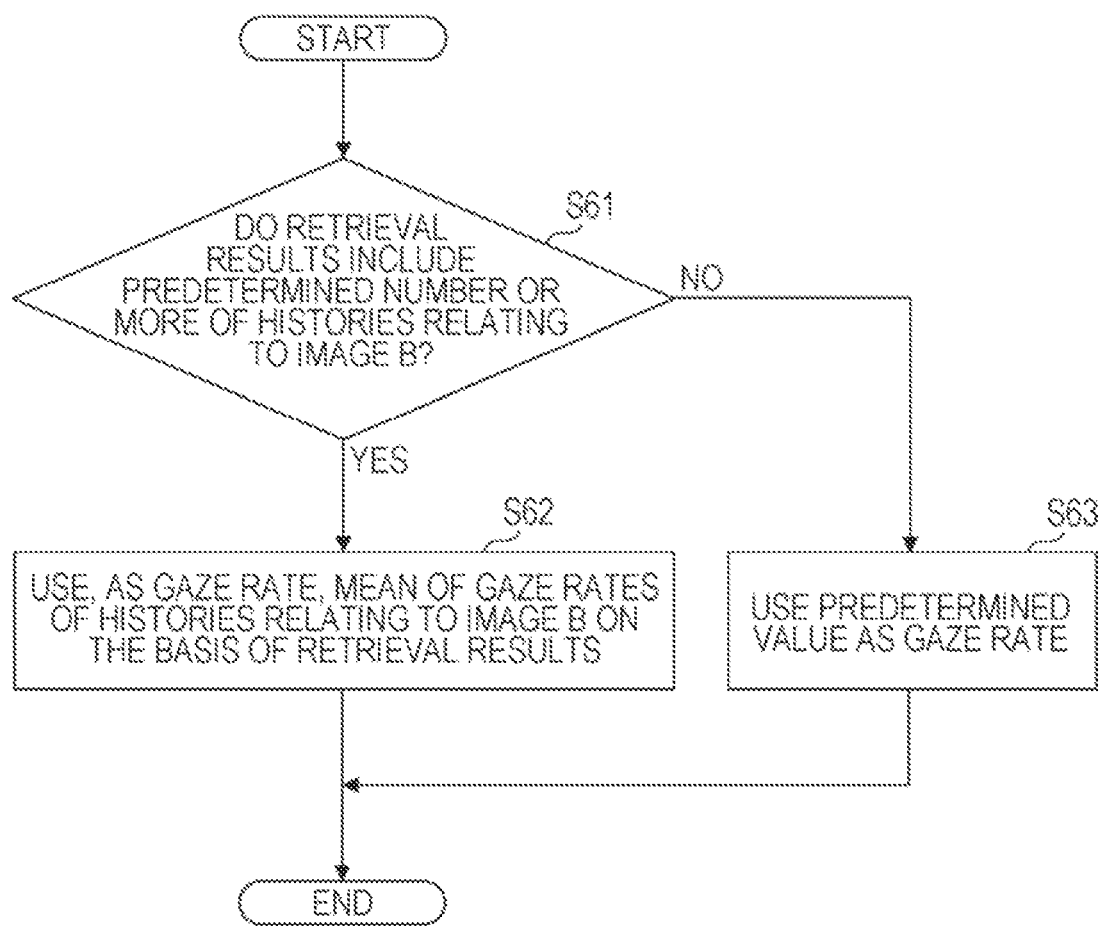
FIG. 46 is a flowchart of a process of calculating the gaze rate of a content image.

FIG. 46 is a flowchart of a process of calculating the gaze rate of a content image. It is assumed in the present flowchart that the content image selection unit 15 performs the process on a content image B.

The content image selection unit 15 determines whether or not the gaze history information 97 includes a predetermined number or more of histories relating to the content image B belonging to the category (Step S61). If the content retrieval results include the predetermined number or more of histories relating to the content image B (YES at Step S61), the content image selection unit 15 determines, as the gaze rate of the content image B, the mean value of the gaze rates of the content image B included in the histories. The content image selection unit 15 calculates the gaze rate of the content image B in accordance with the formula (5).

$$G_I = \frac{1}{n}\sum_{i=1}^{n} g_i \qquad (5)$$

$G_I$: Gaze Rate of Image B $g_i$: Gaze Information (Gaze Rate) of History $i$ $n$: Total Number of Histories Relating to Image B Meanwhile, if the content retrieval results include less than the predetermined number of histories relating to the content image B (NO at Step S61), the content image selection unit 15 uses a predetermined value as the gaze rate. The predetermined gaze rate may be previously set for each content image by the administrator. Alternatively, a single value may be used by all content images as the predetermined gaze rate.

Then, the content image selection unit 15 calculates the presentation priorities of the content images on the basis of the gaze rates of the content images calculated at Step S24 and the distribution priorities of the content images (Step S25). The distribution priorities are recorded in the content image management information 95.

The content image selection unit 15 calculates the presentation priority of a content image in accordance with the formula (6).

Presentation Priority=(Gaze Rate)×(Distribution Priority) (6)

In accordance with a similar method, the content image selection unit 15 calculates the presentation priority of each of the other content images belonging to the category selected at Step S23. The other content images include, for example, newly registered content images and content images small in the number of presentations throughout the entire gaze history information 97.

Then, the content image selection unit 15 determines the content image to be presented (Step S26). The content image selection unit 15 determines, as the content image to be presented, a content image having the highest one of the presentation priorities calculated at Step S25. If a plurality of content images correspond to the highest presentation priority, the content image selection unit 15 may select a content image having a high distribution priority determined by the distributor, or may select a content image having a high gaze rate.

According to the above, the content determination device 10 is capable of presenting the most suitable content image to each group.

Content Image Display Process According to Motional State

The content determination device 10 projects the content image to the position in which people of each group can recognize the contents image. Subsequently, description will be made of a process of selecting the content image according to the motional state of the group.

The content image selection unit 15 detects, from the motional state information 93, the motional state of each of the persons belonging to a group, to thereby identify the motional state of the group. The motional state includes, for example, at rest, walking, waling fast, and running, and is previously categorized and defined in accordance with the moving velocity. For example, the content image selection unit 15 calculates the moving velocity of the group on the basis of the mean velocity of the persons forming the group.

On the basis of the motional state of the group, the content image selection unit 15 controls the video reproduction time length, the presented image size, and the information amount of the content image.

The presented image size refers to the display size of the content image to be projected. The information amount includes, for example, the number of photographs and illustrations and the amount and size of letters included in the content image. An image having a large information amount refers to an image large in both the number of photographs and illustrations and the amount of letters included in the content image. If the information amount is large, it is expected to take a long time for the group to recognize the information. Therefore, a content image having a large information amount is presented when the moving velocity of the group is relatively low. Meanwhile, a group moving at a relatively high moving velocity is presented with a content image having a small information amount, to thereby allow the group to quickly recognize the content image. Further, if the range of the group is large, the content image selection unit 15 can select a content image of a large display size as the image to be projected.

Figure 47:
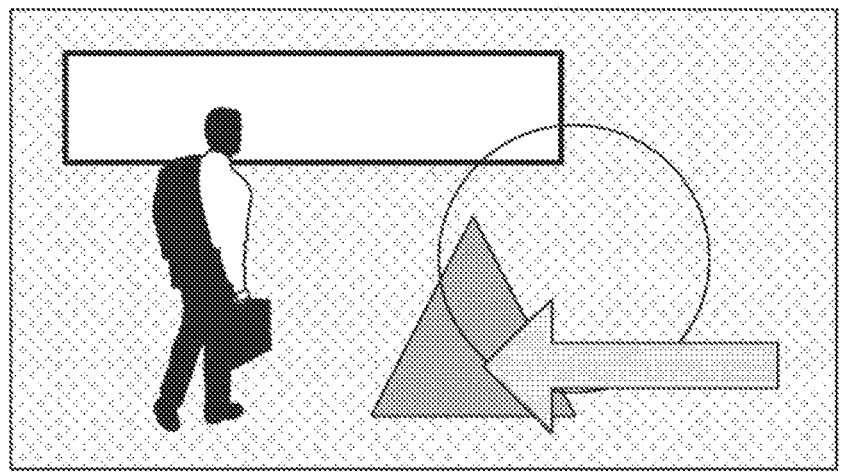
FIG. 47 illustrates an example of a content image including only pictures.
Figure 48:
FIG. 48 illustrates an example of a content image including only letters.
Figure 49:
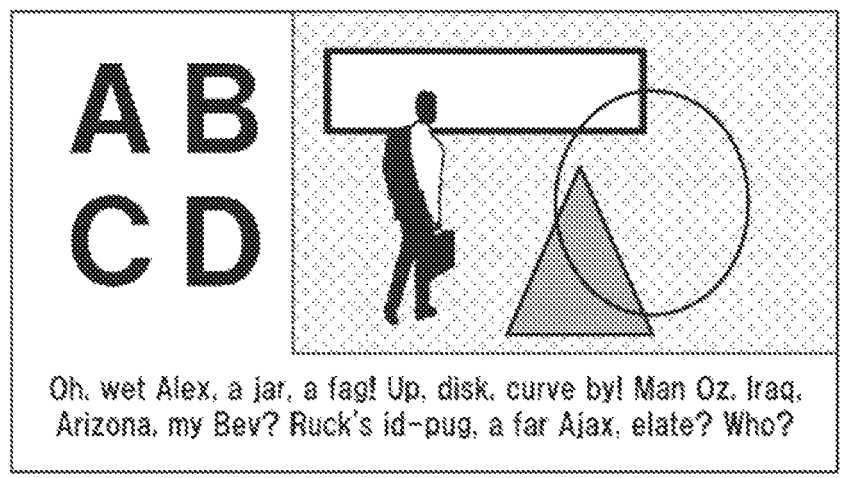
FIG. 49 illustrates an example of a content image including the combination of pictures and letters.
Figure 50:
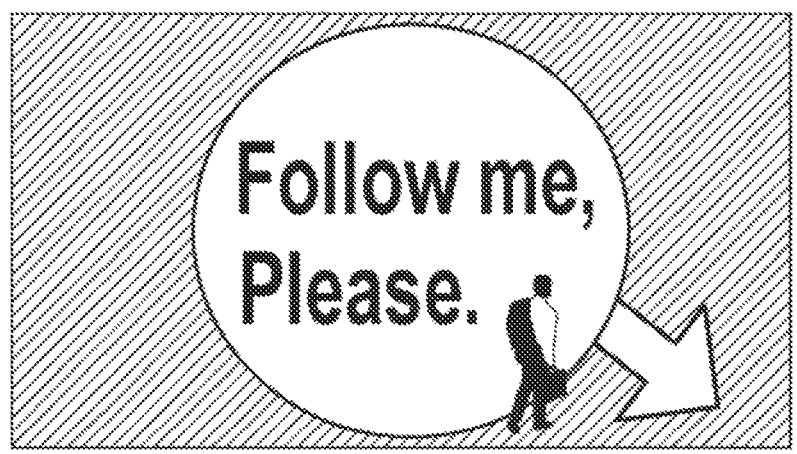
FIG. 50 illustrates a second example of a content image including the combination of pictures and letters.

The content image may be a content image including only pictures, as in FIG. 47, may be a content image including only letters, as in FIG. 48, or may be a content image including the combination of pictures and letters, as in FIGS. 49 and 50.

As for the method of determining the reproduction time length, the presented image size, and the information amount, the reproduction time length, the presented image size, and the information amount may be determined in accordance with a predetermined condition on the basis of the motional state or the moving velocity, or may be determined to attain the highest gaze rate in the gaze history holding unit 17. The predetermined condition is, for example, that an image having a long reproduction time and a large information amount is presented to a person at rest, in consideration that it is highly possible that the person will gaze at the image for a long time.

Figure 51:
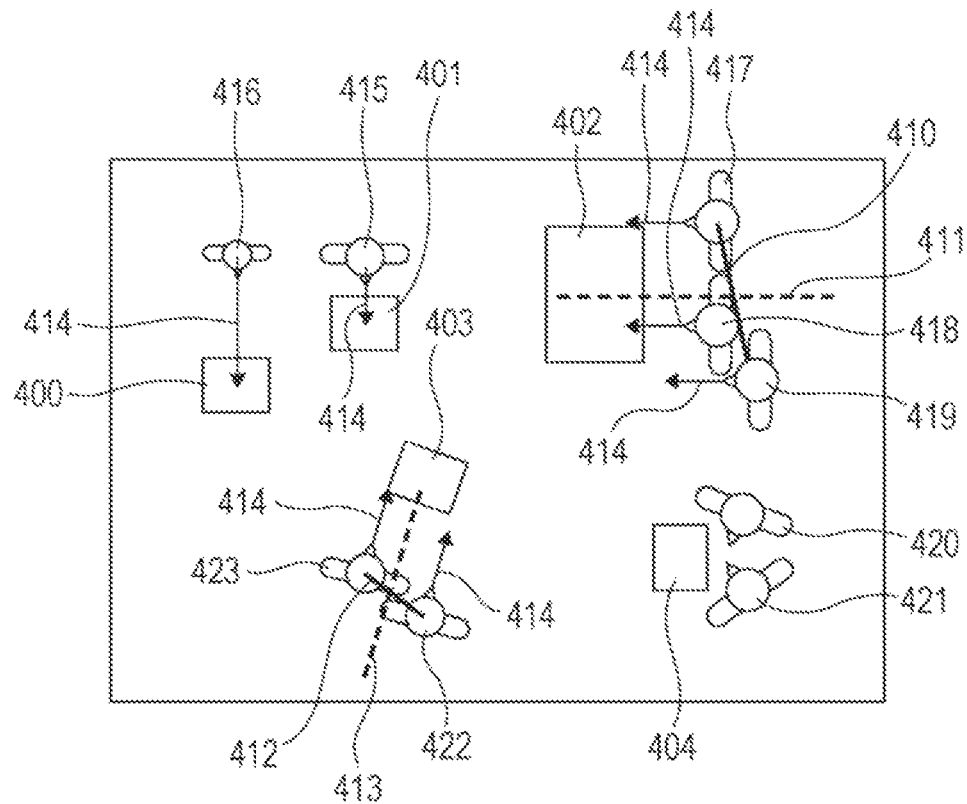
FIG. 51 illustrates a projection example of content images.

Then, the content image selection unit 15 determines the arrangement position of the content image to be projected to the group. FIG. 51 illustrates an example of the arrangement positions of content images. Reference numerals 400, 401, 402, 403, and 404 represent projected content images. A reference numeral 414 represents the velocity vector of a person. The length of the line of the velocity vector 414 indicates the value of the velocity. A reference numeral 410 represents a line connecting persons 417 and 419. A reference numeral 411 represents a line passing through the midpoint of the line 410 and parallel to the directions of the respective velocity vectors of persons 417, 418, and 419. A reference numeral 412 represents a line connecting persons 422 and 423. A reference numeral 413 represents a line passing through the midpoint of the line 412 and parallel to the directions of the respective velocity vectors of the persons 422 and 423. Reference numerals 415, 416, 417, 418, 419, 420, 421, 422, and 423 represent persons within the projection area of content images.

The content image selection unit 15 arranges a content image on, for example, a line passing through the midpoint of a line connecting a plurality of persons forming a group and parallel to the direction of the velocity vector of the group. The content image selection unit 15 identifies, for example, a line connecting the coordinates of the positions of the plurality of persons acquired by the motional state acquisition unit 13. In this case, the centroid position of a person as viewed from above is determined as the coordinates of the center of the person. Then, the content image selection unit 15 identifies the midpoint of the identified line. The content image selection unit 15 identifies the direction of the velocity vector of the group on the basis of the velocity vectors of the plurality of persons acquired by the motional state acquisition unit 13. The content image selection unit 15 identifies the direction of the velocity vector of the group on the basis of, for example, the mean of the directions of the plurality of velocity vectors.

The content image selection unit 15 arranges the content image on the line passing through the identified midpoint and parallel to the velocity vector of the group. It is now assumed that the persons 422 and 423 form a group. The content image 403 is arranged on the line 413, which passes through the midpoint of the line 412 connecting the persons 422 and 423, and which extends along the direction of the velocity vector of the group of the persons 422 and 423. The content image 403 is arranged on the line 413 and on the front side of the line 12 in the moving direction of the persons 422 and 423.

The content image selection unit 15 determines the distance between a group and the corresponding content image in accordance with the moving velocity of the group. If the group is moving at a velocity higher than a predetermined velocity, the content image selection unit 15 arranges the content image at a position far from the group. Further, if the group is moving at a velocity lower than the predetermined velocity, the content image selection unit 15 arranges the content image at a position close to the group. It is now assumed that each of the persons 415 and 416 forms a group of one person. The persons 415 and 416 have different moving velocities. In this case, the content image selection unit 15 arranges the content image 401 at a near distance from the person 415 moving at a low moving velocity. Further, the content image selection unit 15 arranges the content image 400 at a far distance from the person 416 moving at a high moving velocity.

If a group is formed by three or more persons, the content image selection unit 15 identifies a line connecting persons forming the group and located at ends of the group, and arranges a content image on a line passing through the midpoint of the identified line and extending along the direction of the velocity vector of the group. It is now assumed that the persons 417, 418, and 419 form a group. In this case, the persons 417 and 419 are located at the ends of the group. The content image selection unit 15 identifies the persons located at the ends of the group by, for example, calculating a direction perpendicular to the velocity vector of the group and identifying the persons apart from each other by the largest distance in the perpendicular direction.

The content image selection unit 15 identifies the line 410 connecting the persons 417 and 419. The content image selection unit 15 arranges a content image on the line 411 passing through the midpoint of the line 410 and parallel to the velocity vector of the group.

If a group is at rest, the content image selection unit 15 arranges a content image at a position apart from the group by a predetermined distance. It is now assumed that the persons 420 and 421 form a group. In this case, the content image selection unit 15 arranges the content image 404 at a position apart from the persons by a predetermined distance. The content image selection unit 15 estimates the direction of a person on the basis of the direction from which the person has moved in the past. Further, the content image selection unit 15 arranges a content image in the direction faced by the group.

The content image selection unit 15 changes the angle of the content image to coincide with the direction of the velocity vector.

After the determination of the arrangement position and the arrangement angle of the content image, the content image selection unit 15 generates a projection image, and transmits the projection image to the content image display unit 16. The content image display unit 16 projects the acquired projection image.

Further, as for the fineness of the control of the content image to be presented, a few types of content images different in reproduction time length, size, and information amount are previously prepared for the same content and stored in the content image storage unit 20. The content image selection unit 15 may control the content image in a phased manner within the range of the differences. Further, the content image selection unit 15 may present the content image while dynamically editing the reproduction time length and the presented image size of the content image.

According to the above, the content determination device 10 is capable of presenting, to each of groups such as a parent and a child, a couple, and office workers, the content image suitable for the attribute and the motional state of the group. The content determination device 10 is capable of separately performing the following processes or performing more than one of the processes in combination: a process of identifying a group in accordance with the moving directions of persons, and determining the content image for each group; a process of determining the attribute of the group in accordance with the combination of the appearances of the persons forming the group, and determining the content image in accordance with the attribute; and a process of determining the content image in accordance with the gaze rates of the persons forming the group.

Hardware Configuration of Content Determination Device 10

Subsequently, a hardware configuration of the content determination device 10 will be described.

Figure 52:
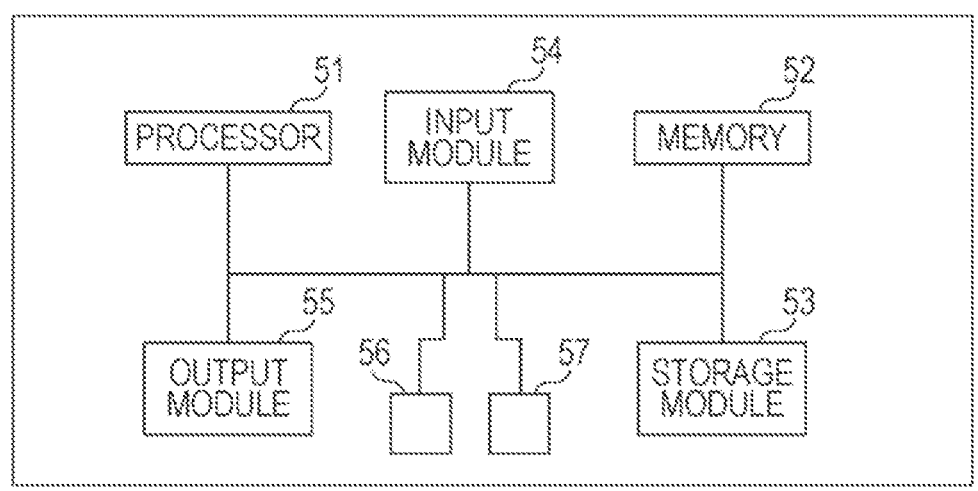
FIG. 52 illustrates an example of the hardware configuration of the content determination device according to the present embodiment.

FIG. 52 illustrates an example of the hardware configuration of the content determination device 10 according to the present embodiment. The content determination device 10 is a computer including a processor 51, a memory 52, a storage module 53, an input module 54, an output module 55, a photographing module 56, a projection module 57, and so forth.

The processor 51 is, for example, a CPU (Central Processing Unit), and performs a variety of operations of programs executed by the content determination device 10. For example, the processor 51 executes a content determination program extracted into the memory 52, to thereby function as the gaze information measurement unit 12, the motional state acquisition unit 13, the attribute information acquisition unit 14, and the content image selection unit 15.

The memory 52 temporarily stores a variety of data used by the content determination device 10 and a variety of programs executed by the content determination device 10. Further, the memory 52 includes an image memory. The image memory corresponds to a storage area for storing the data of images to be output to the projection module 57.

The storage module 53 stores a variety of data used by the content determination device 10 and the content determination program executed by the content determination device 10. The storage module 53 functions as the image information storage unit 21, the content image storage unit 20, the content image management information storage unit 19, the gaze history holding unit 17, and the attribute information holding unit 18. The storage module 53 has a function of reading or writing information from or into a readable storage medium. The readable storage medium is non-transitory. The readable storage medium includes, for example, an internal storage device mounted in a computer, such as a ROM (Read-Only Memory) and a RAM (Random Access Memory), and a portable storage medium, such as a CD (Compact Disc)-ROM, a flexible disc, a DVD (Digital Versatile Disc), a magneto-optical disc, and an IC (Integrated Circuit) card. The non-transitory storage medium may be placed at a remote location, and a program stored therein may be used.

In accordance with an instruction from the processor 51, the projection module 57 functions as the content image display unit 16 for displaying content images. The projection module 57 includes, for example, a projector, a display, and so forth.

In accordance with an instruction from the processor 51, the photographing module 56 functions as the photographing unit 11 and the second photographing unit 22 for acquiring images. The photographing module 56 includes, for example, a camera, a video camera, and so forth. The content determination device 10 may include a plurality of photographing modules 56.

The input module 54 is a device for allowing the administrator to input a variety of information to the computer, and includes, for example, a keyboard, a mouse, and so forth. The output module 55 is a device for outputting a variety of information of the computer, and includes a display, for example.

The content determination device 10 disclosed herein is applicable to a field of displaying content to a plurality of persons.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable medium storing a content determination program causing a computer to perform a procedure, the procedure comprising:
  detecting a plurality of persons appearing in a plurality of chronologically photographed images;
  identifying whether image content is displayed to the plurality of persons;
  detecting a position of each of the plurality of persons;
  calculating a moving velocity of each of the plurality of persons when identifying that the image content is not displayed to the plurality of persons;
  detecting distances among a part of the plurality of persons when identifying that the image content is displayed to the plurality of persons;
  setting a group including the part of the plurality of persons on the basis of the moving velocities and the positions;
  acquiring attribute information of the group on the basis of a person image corresponding to the each of the part of the plurality of persons included in the group; and
  determining, on the basis of a correspondence relationship between the attribute information of the group and attribute information of content images stored in a storage unit, one of the content images to be projected to a position which each of the part of the plurality of persons of the group recognizes.

2. The non-transitory computer-readable medium according to claim 1, wherein the setting process sets the part of plurality of persons with the group if the distances are within a predetermined distance.

3. The non-transitory computer-readable medium according to claim 1, wherein the setting process sets the part of plurality of persons with the group if the moving velocities of the part of plurality of persons are included in a predetermined range.

4. The non-transitory computer-readable medium according to claim 1, wherein, if the distances are within a predetermined distance from each other, and if the moving velocities of the part of plurality of persons are included in a predetermined range, the setting process sets the part of plurality of persons with the group.

5. The non-transitory computer-readable medium according to claim 1, the content determination program further causing the computer to perform a procedure, the procedure comprising:
  detecting a face image portion of each of the part of plurality of persons;
  extracting the direction of the eyes of the each of the part of plurality of persons on the basis of the detected face image, and
  determining a gaze rate by calculating a proportion of time of staring the content image by the part of the plurality of the persons to time of projecting the content image,
  wherein the determination process further determines, in accordance with the calculated gaze rate and the attribute information, next content image to be projected.

6. A content projector comprising:
  a storage unit for storing content images associated with attribute information;
  a photographing unit for chronologically photographing a plurality of persons to generate a plurality of chronologically photographed images;
  a processor; and
  a projection unit for projecting content image,
  wherein the processor includes:
  a motional state acquisition unit configured to detect the plurality of persons appearing in the plurality of chronologically photographed images, identify whether the image content is displayed to the plurality of persons, detect a position of each of the plurality of persons and calculate a moving velocity of each of the plurality of persons when identifying that the image content is not displayed to the plurality of persons, detect distances among a part of the plurality of persons when identifying that the image content is displayed to the plurality of persons, and set the group including a part of the plurality of persons on the basis of the moving velocities and the positions;
  an attribute information acquisition unit configured to acquire attribute information of the group on the basis of a person image corresponding to the each of the part of the plurality of persons included in the group; and
  a content image selection unit configured to determine, on the basis of the correspondence relationship between the attribute information of the group and attribute information of content images stored in the storage unit, one of the content images to be projected to a position in which each of the part of the plurality of persons of the group recognizes the contents image.

7. A method of controlling a content projector comprising:
  detecting a plurality of persons appearing in a plurality of chronologically photographed images;
  identifying whether image content is displayed to the plurality of persons;
  detecting a position of each of the plurality of persons;
  calculating a moving velocity of each of the plurality of persons when identifying that the image content is not displayed to the plurality of persons;
  detecting distances among a part of the plurality of persons when identifying that the image content is displayed to the plurality of persons;
  setting a group including the part of the plurality of persons on the basis of the moving velocities and the positions;
  acquiring attribute information of the group on the basis of a person image corresponding to the each of the part of the plurality of persons included in the group; and
  determining, on the basis of a correspondence relationship between the attribute information of the group and attribute information of content images stored in a storage unit, one of the content images to be projected to a position which each of the part of the plurality of persons of the group recognizes.

8. The non-transitory computer-readable medium according to claim 1, wherein the setting process divides the part of plurality of persons into a plurality of group if the distances are greater than a predetermined distance.

9. The non-transitory computer-readable medium according to claim 8, wherein the image content is displayed individually to each of the plurality of group when the part of plurality of persons are divided into the plurality of group.

10. The content projector according to claim 6, wherein the setting process divides the part of plurality of persons into a plurality of group if the distances are greater than a predetermined distance.

11. The content projector according to claim 10, wherein the image content is displayed individually to each of the plurality of group when the part of plurality of persons are divided into the plurality of group.

12. The method according to claim 7, wherein the setting process divides the part of plurality of persons into a plurality of group if the distances are greater than a predetermined distance.

13. The method according to claim 12, wherein the image content is displayed individually to each of the plurality of group when the part of plurality of persons are divided into the plurality of group.

* * * * *